United States Patent [19]
Shido et al.

[11] Patent Number: 5,757,760
[45] Date of Patent: May 26, 1998

[54] INFORMATION RECORDING AND/OR REPRODUCING APPARATUS AND METHOD FOR PERFORMING RECORDING AND/OR REPRODUCTION OF INFORMATION BY USING PROBE

[75] Inventors: Shunichi Shido, Sagamihara; Ryo Kuroda, Kawasaki, both of Japan

[73] Assignee: Canon Kabushiki Kaisha, Tokyo, Japan

[21] Appl. No.: 783,366

[22] Filed: Jan. 16, 1997

[30] Foreign Application Priority Data

Jan. 18, 1996 [JP] Japan .................................. 8-024735
Jan. 18, 1996 [JP] Japan .................................. 8-024740

[51] Int. Cl.$^6$ .............................. G11B 9/00; G02B 21/00
[52] U.S. Cl. ........................ 369/126; 369/130; 250/306
[58] Field of Search ............................ 369/126, 124, 369/130; 250/306

[56] References Cited

U.S. PATENT DOCUMENTS

| | | | |
|---|---|---|---|
| 5,222,060 | 6/1993 | Kuroda et al. | 369/126 |
| 5,282,191 | 1/1994 | Yamano et al. | 369/126 |
| 5,289,455 | 2/1994 | Kuroda et al. | 369/126 |
| 5,375,114 | 12/1994 | Hatanaka et al. | 369/126 |
| 5,418,363 | 5/1995 | Elings et al. | 369/126 |
| 5,446,720 | 8/1995 | Oguchi et al. | 369/126 |
| 5,610,898 | 3/1997 | Takimoto et al. | 369/126 |

FOREIGN PATENT DOCUMENTS

| | | | |
|---|---|---|---|
| 63-161552 | 7/1988 | Japan . | |
| 63-161553 | 7/1988 | Japan . | |
| 2-050333 | 2/1990 | Japan . | |
| 3-173957 | 7/1991 | Japan . | |
| 4-123338 | 4/1992 | Japan . | |
| 4-212737 | 8/1992 | Japan . | |
| 4-355231 | 12/1992 | Japan . | |
| 4-364244 | 12/1992 | Japan | G11B 9/00 |

OTHER PUBLICATIONS

G. Binning et al., "Surface Studies By Scanning Tunneling Microscopy," Phys. Rev. Lett., vol. 49, 1982, pp. 57–61.

*Primary Examiner*—Georgia Y. Epps
*Assistant Examiner*—Kim-Kwok Chu
*Attorney, Agent, or Firm*—Fitzpatrick, Cella, Harper & Scinto

[57] ABSTRACT

In an information recording and/or reproduction apparatus, a recorded bit row on a record medium is relatively scanned with a probe and the recorded bit is detected. The information recording and/or reproduction apparatus includes a scanning unit for effecting a plurality of relative scans of the recorded bit row with the probe, a detecting unit for detecting a tilt of the recorded bit row relative to a direction of the relative scan on the basis of a reproduction signal obtained by the scans performed by the scanning unit, and a correction unit for correcting the direction of the relative scan on the basis of a detected result by the detecting unit.

9 Claims, 20 Drawing Sheets

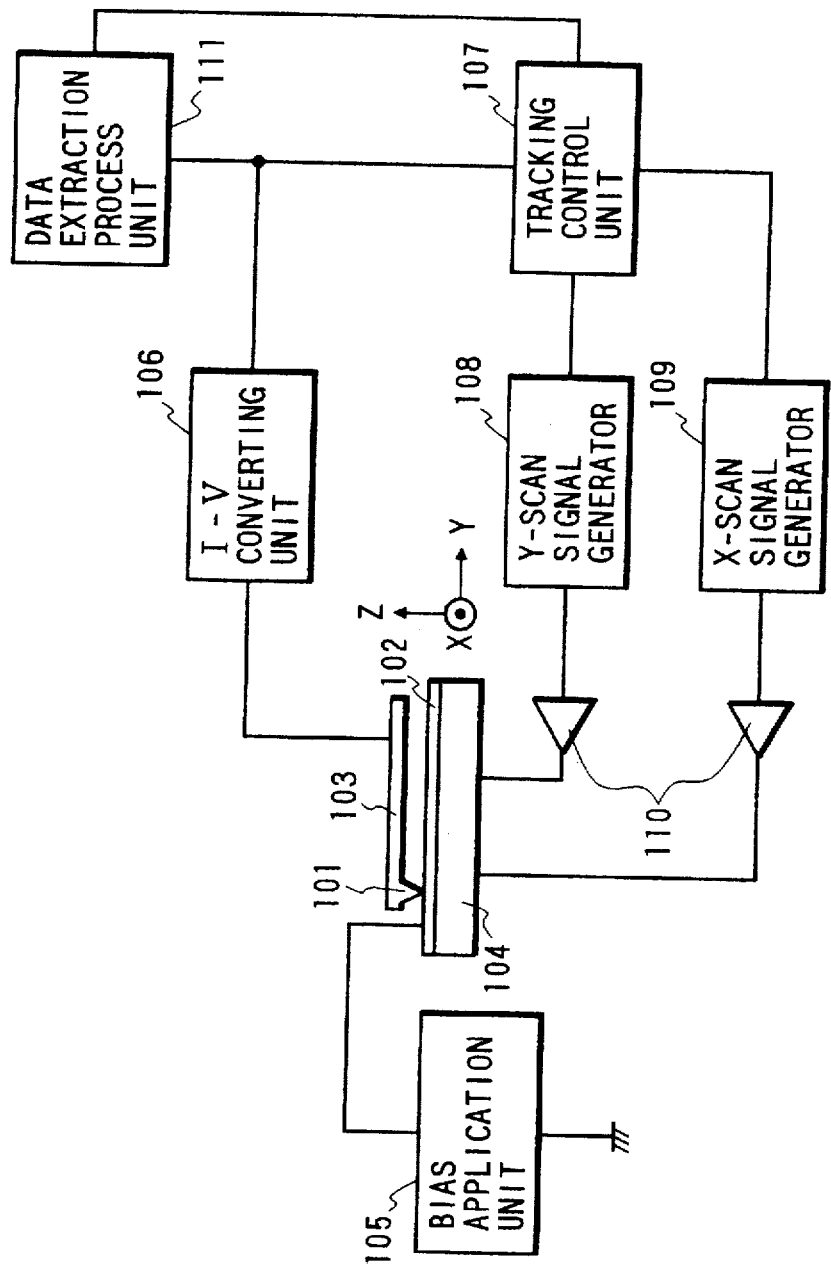

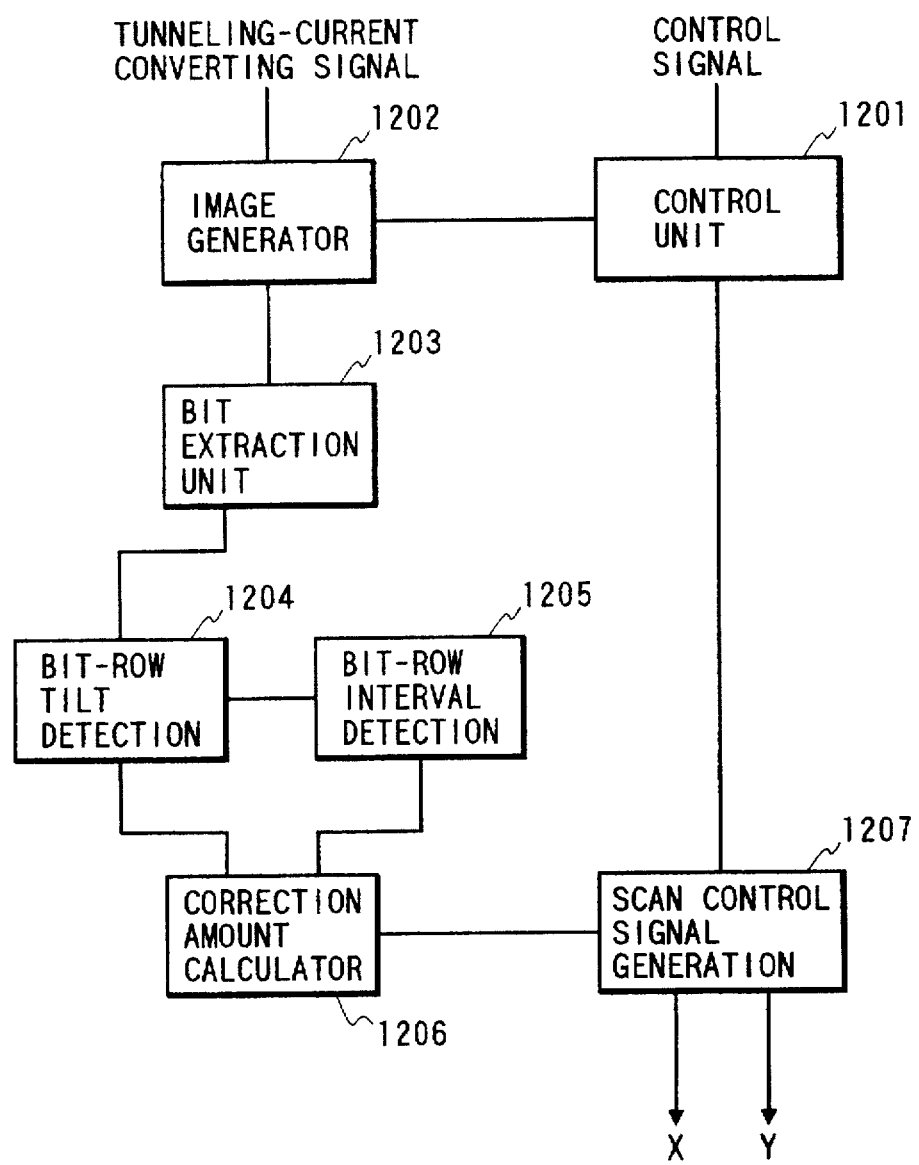

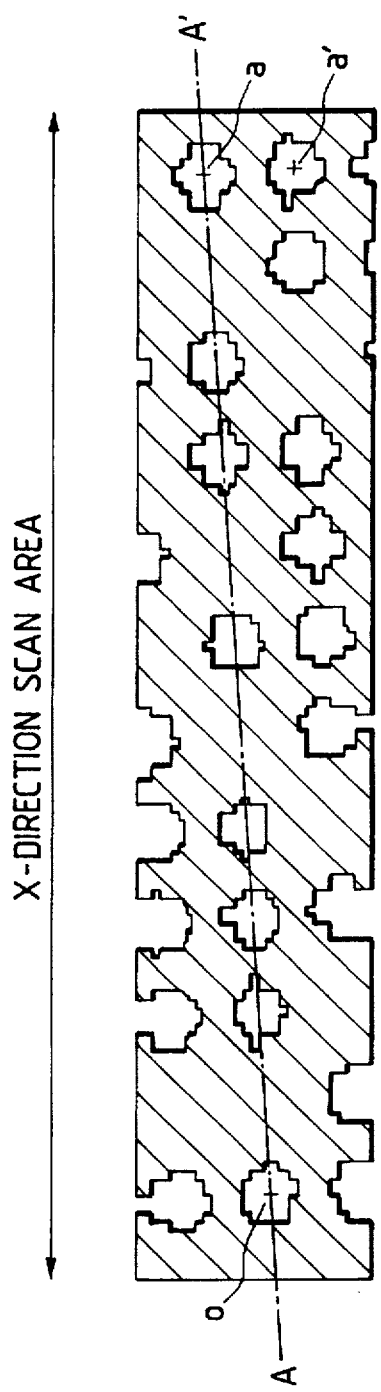
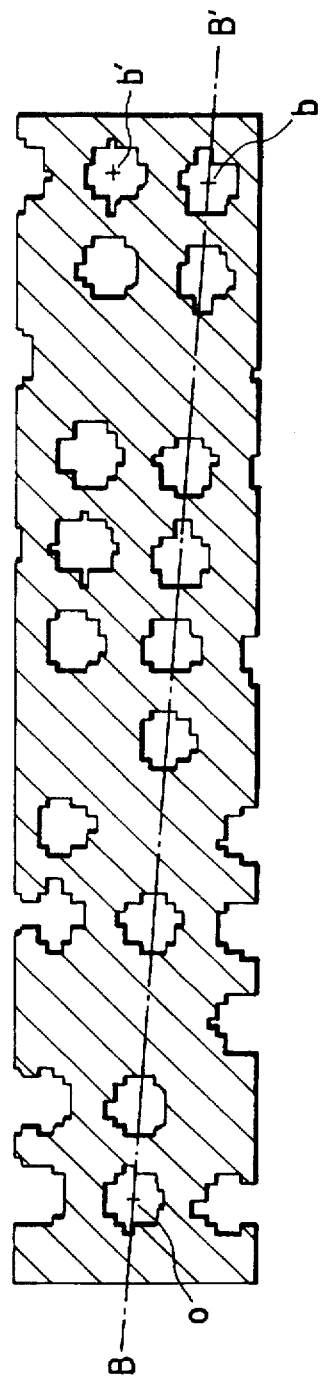
FIG. 4A
FIG. 4B

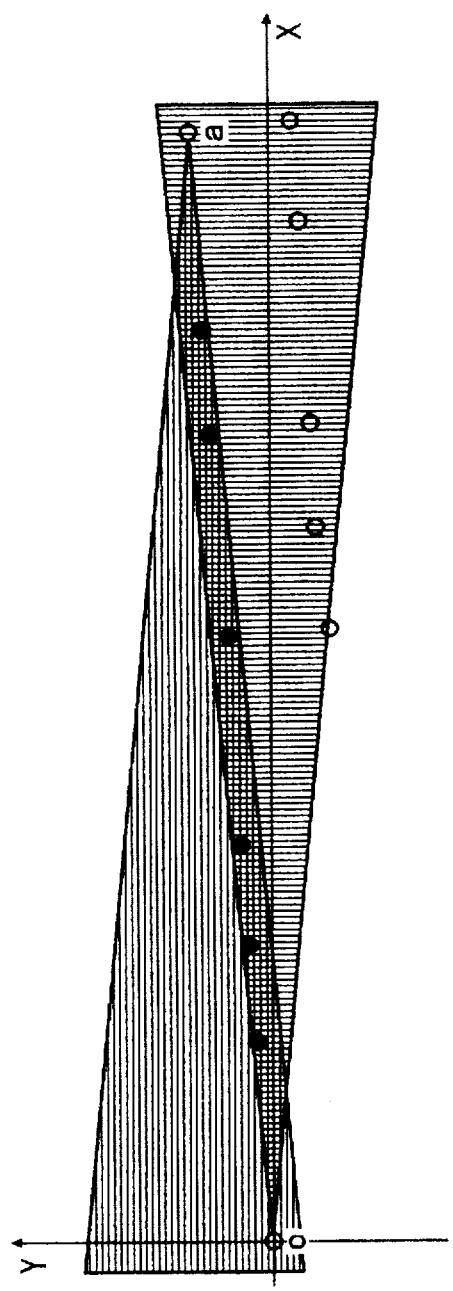
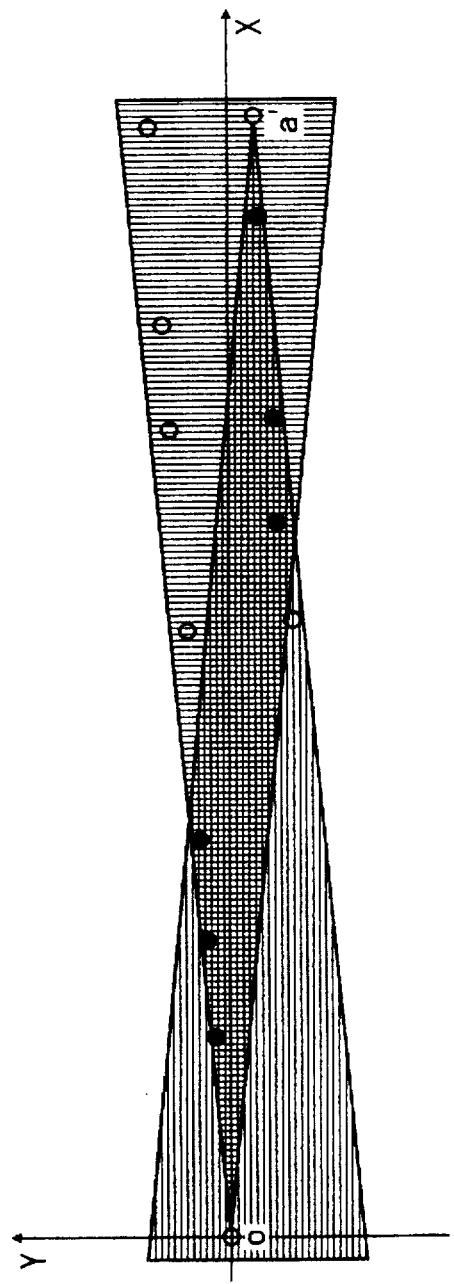
FIG. 5A
FIG. 5B

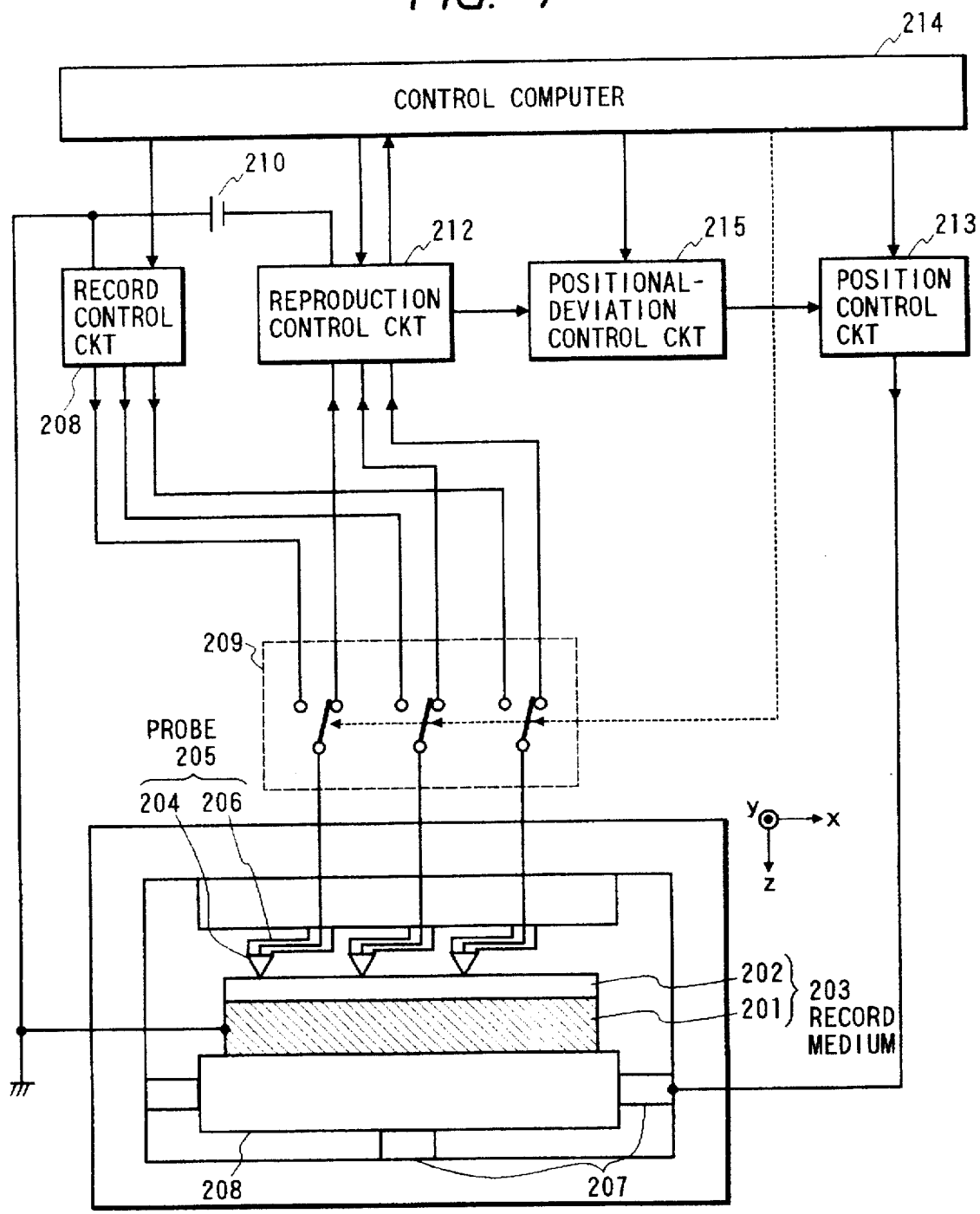

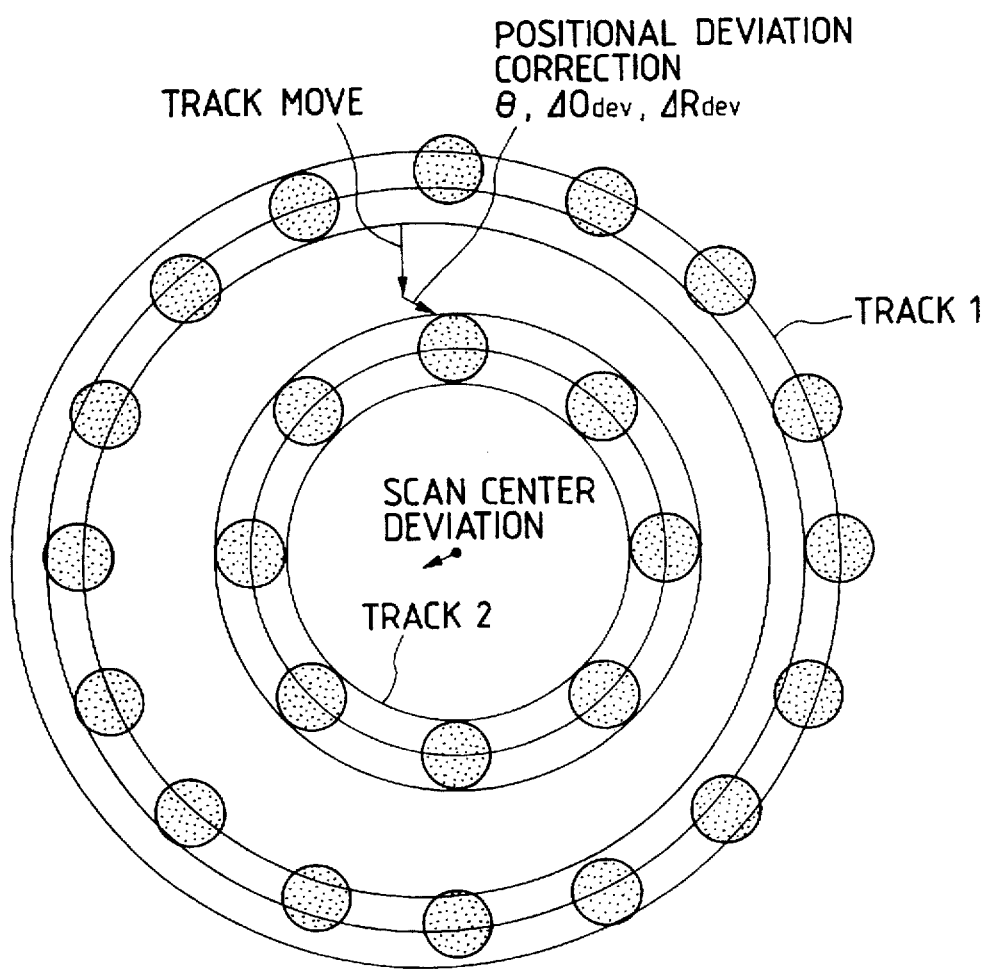

INFORMATION RECORDING AND/OR REPRODUCING APPARATUS AND METHOD FOR PERFORMING RECORDING AND/OR REPRODUCTION OF INFORMATION BY USING PROBE

BACKGROUND OF THE INVENTION

1. Field of the Invention

The present invention relates to an information recording and/or reproducing apparatus for performing recording, reproduction and/or elimination of information or data on a medium, utilizing the physical phenomenon effected by bringing a probe tip and the medium close to each other.

2. Related Background Art

Recently, applications of memory materials are the core of electronics industries including computers and related devices thereto, video disks, and digital audio disks, and development of the materials is also very vivid.

Characteristics required in the memory materials vary with their uses, but a high-speed response in recording and reproduction is indispensable to all the memory materials.

The majority of conventional memories were magnetic memories and semiconductor memories using magnetic and semiconductor materials, but with progress in laser technology, cheap and high-density recording media are coming along as optical memories using an organic thin film of an organic dye, a photopolymer, or the like.

Further, the recent development of the scanning tunnel microscope (hereinafter referred to as STM), which was able to directly observe an electron structure of atoms in a sample surface with extremely high resolution (on the order of a nanometer or less) (G. Binnig et al., Phys. Rev. Lett., 49 (1982) 57), is significant. With the STM, real-space images of crystalline and amorphous materials can be measured with high resolution, and the measurement can be advantageously executed under low electric power without imparting to the material any damage due to the current. Further, the STM can also operate in air and can be used for various materials, so that a wide scope of application thereof is expected.

The STM utilizes the fact that a tunneling current flows depending upon a voltage applied between a probe tip and an electrically-conductive medium surface when the probe electrode is brought close to the medium surface at the distance of about 1 nm or less. The tunneling current is very sensitive to a change in the distance between the probe tip and the material, depending upon this distance in a form of an exponential function. The STM can read even various information on total electron cloud in the real space by scanning with the probe as keeping the tunneling current constant. The resolution in the in-plane direction therein is about 0.1 nm.

As a result, super-high-density recording and reproduction can be performed well on an atomic order (i.e., sub-nanometer) by the application of the principle of the STM. For example, in an information processing apparatus disclosed in Japanese Laid-Open Patent Application No. 61-80536, data is written by removing atomic particles adsorbed on the medium surface with an atomic beam or the like, and the thus-written data is reproduced by the STM.

Further, Japanese Laid-Open Patent Applications Nos. 63-161552 and 63-161553, etc., disclose methods for recording and/or reproducing information with the STM using as a recording layer a material having a memory effect to current or voltage switching characteristics of conductivity change, for example, a thin film layer of one out of conjugated π-electron group organic compounds and chalcogenides.

This method allows high-density and large-capacity recording and/or reproduction even of 1 Terabits/$cm^2$ when the bit size of recording is 10 nm.

In the above-discussed information recording and/or reproducing apparatuses, data is recorded in the material surface by any electric method while the material surface is scanned parallel to its surface by the probe tip, and the recorded data is reproduced by measuring the physical phenomenon (such as a tunneling current) created when the probe tip and the material are brought close to each other.

In those information recording and/or reproducing apparatuses, since recorded bits are very small, it is generally necessary, in order to achieve data reproduction with good S/N, to perform a tracking control by moving the probe tip along rows of the recorded bits or bit rows while a feedback control is executed. For example, Japanese Laid-Open Patent Application No. 4-123338 discloses a tracking method in which the position of the probe tip is controlled in a direction perpendicular to the direction of the recorded bit row array while the recorded bit row is scanned with the probe tip such that the amplitude of detected bit is maximized.

Further, Japanese Laid-Open Patent Application No. 4-212737 discloses a tracking method in which the recorded bits are detected while the probe tip is vibrated with a small amplitude in a direction perpendicular to the direction of the recorded bit row array, the positional deviation of the probe relative to the recorded bit row in the perpendicular direction is detected from a modulation component of the detected signal of the recorded bit and the control is carried out such that the positional deviation is eliminated.

Furthermore, Japanese Laid-Open Patent Application No. 2-50333 discloses a reproducing method for reproducing recorded bits without performing a direct tracking control to the recorded bit rows in which data is read at the time of reproduction by scanning the medium with the probe tip at a density higher than a recording density and the recorded data is reproduced using the technology of pattern recognition.

Furthermore, Japanese Laid-Open Patent Application No. 4-364244 discloses a reproducing method for reproducing recorded data in which a logical sum signal of a plurality of scanned data rows is used as a reproduction signal without performing the pattern recognition processing.

Furthermore, Japanese Laid-Open Patent Application No. 4-355231 discloses a reproducing method in which two preliminary scans are performed to the recorded bit rows prior to a real scan for detecting the recorded bits, two detected signals are integrated to obtain a differential output, the amount of the positional deviation between the preliminary scans, the recorded bit row is detected from that output value and the real scan is executed after the positional deviation is corrected.

In addition, regarding a relevant art other than the tracking method, Japanese Laid-Open Patent Application No. 3-173957, discloses a method in which access of the probe to circularly-recorded bit row is executed.

In all the above-discussed tracking methods, however, it is basically assumed that the tracking control is performed relative to the recorded bit row with one probe tip but not with a plurality of probes. Although it may be possible that the tracking control is executed in an apparatus with the plural probes, using the above-discussed tracking method, respective positional deviation amounts between the plural probes and the corresponding recorded bit rows will be large when various error factors (such as the thermal expansion, process error, mechanical distortion and setting error) are larger than certain limits. Thus, it is difficult to carry out a simultaneous access of the plural probes to the corresponding recorded bit rows and perform the data detection.

In order to solve such a problem, it may be possible that the recorded bits are treated as two-dimensional data (i.e., the recorded bits are not detected in a one-dimensional manner) and the data detection is carried out using the technology of image processing. This solution is, however, unsuitable for a high-speed data reproduction because it takes much time to execute steps of detecting the two-dimensional data and performing the image processing.

Hence, there has been proposed a method in which detection of recorded bits, detection of the positional deviation and correction of the positional deviation are carried out by using a plurality of scans (raster scans or circular scans). This method is an intermediate technology between one-dimensional method and two-dimensional method. In this method, tolerance is large to respective positional deviations between the plural probes and the corresponding recorded bit rows and the data reproduction speed can be advantageously increased to some extent.

In such a method, however, where the deviation amount between the entire plural probes and the record medium is large due to relaxation of mechanical distortion, temperature drift subsequent to the apparatus setting and creep (relaxation and drift) of an actuator, such as a piezoelectric element, used for the control of positions of scan, tracking motion and the like, a direction of the probe scan is liable to deviate from a direction of the recorded bit row array and errors likely occur in detecting the recorded bits.

SUMMARY OF THE INVENTION

It is, therefore, an object of the present invention to provide a highly-reliable recording and/or reproduction apparatus and a method thereof in which errors in detecting recorded bits can be notably reduced to solve the above-discussed problems.

The above object is achieved by an information recording and/or reproduction apparatus in which the recorded bit row of a record medium is relatively scanned with a probe and the recorded bit is detected. The information recording and/or reproduction apparatus includes:

- a scanning unit for effecting a plurality of relative scans of the recorded bit row with the probe;
- a detecting unit for detecting a tilt of the recorded bit row relative to a direction of the relative scan on the basis of a reproduction signal obtained by the scans performed by the scanning unit; and
- a correction unit for correcting the direction of the relative scan on the basis of a detected result by the detecting unit.

The above object is also achieved by an information recording and/or reproduction method in which a recorded bit row on a record medium is relatively scanned with a probe and the recorded bit is detected. The information recording and/or reproduction method includes:

- a scanning step of effecting a plurality of relative scans of the recorded bit row with the probe;
- a detecting step of detecting a tilt of the recorded bit row relative to a direction of the relative scan on the basis of a reproduction signal obtained by the scans performed in the scanning step; and
- a correction step of correcting the direction of the relative scan on the basis of a detected result obtained in the detecting step.

The details will be explained in the description of embodiments to follow.

BRIEF DESCRIPTION OF THE DRAWINGS

FIG. 1 is a view illustrating a setup of a recording and/or reproducing apparatus in Embodiment 1 of the present invention;

FIG. 2 is a block diagram explaining the operation of a tracking control unit in Embodiment 1 of the present invention;

FIGS. 4A and 4B are respectively views illustrating the image of bits in a form of binarized reproduction current;

FIGS. 5A and 5B are respectively views illustrating a method for searching a bit row;

FIG. 7 is a view illustrating the entire structure of a recording and/or reproducing apparatus in Embodiment 3 of the present invention;

FIG. 18 is a view illustrating a method of correcting the positional deviation;

DETAILED DESCRIPTION OF THE PREFERRED EMBODIMENTS

Figure 3A:
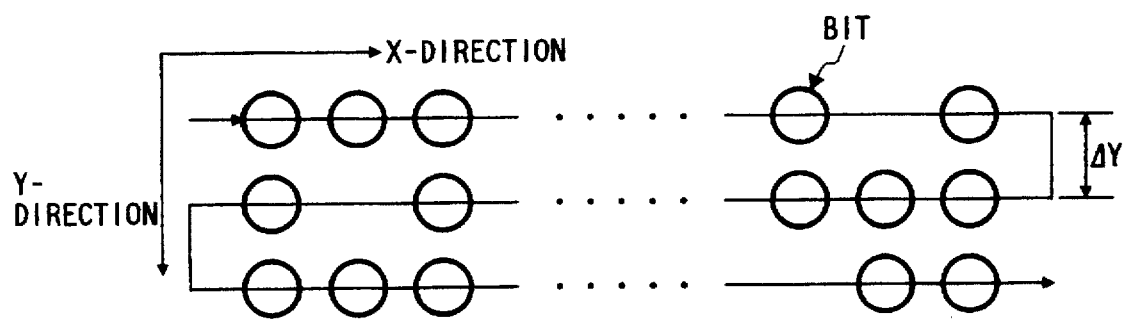
FIGS. 3A and 3B are respectively views explaining the size of bits and scanning methods in Embodiment 1 of the present invention.

Embodiments of the present invention will be described hereinafter.

Embodiment 1

FIG. 1 shows the structure of Embodiment 1 of the present invention.

A probe is made up of a probe tip 101 and a lever portion 103, and a record medium 102 is put opposite to the probe tip 101. The interval between the probe tip 101 and the record medium 102 is controlled by an interval control mechanism (not shown) such that the interval is always maintained at a constant distance. A bias application unit 105 applies a DC bias for reading or a voltage pulse for writing to the medium 102. Timings of applications thereof are controlled by a record control mechanism (not shown). Reference numeral 104 designates a stage on which the medium 102 is fixedly put, and a relative position (positions in X-direction and Y-direction) between the medium 102 and the probe tip 101 is controlled in a direction of the medium surface. The stage 104 performs a relative scan between the probe tip 101 and the medium 102 in main-scan direction (the X-direction) and sub-scan direction (the Y-direction). Thus, the probe tip 101 can read information in a desired area of the record medium 102 by a raster scan in the X and Y-directions. A single raster is along the X-direction, and data in the raster can be read by the scanning in the X-direction. The Y-direction is a direction along which rasters are arranged.

When the DC bias for reading is applied to the medium 102 by the bias application circuit 105, a tunneling current flows between the probe tip 101 and the medium 102 when those are placed at a predetermined appropriate interval. The tunneling current is input into a next-stage I-V converting unit 106 and converted into a voltage signal (referred to as a tunneling current signal) therein. The tunneling current signal is input into a data extraction process unit 111 and a tracking control unit 107.

The data extraction process unit 111 extracts recorded data from the input tunneling current signal, and supplies the extracted data to a downstream-stage information processing unit (not shown) for use as information. The tracking control unit 107 controls a Y-scan signal generator 108 and an X-scan signal generator 109 on the basis of the input tunneling current signal, and controls the scan operation of the stage 104. Amplifiers 110 convert scan signals from the Y-scan and X-scan signal generators 109 and 108 into signals for driving the stage 104.

In this embodiment, the medium 102 is composed of polyimide which is organic polymer having conjugated π-electron group organic compound laminated by Langmuir-Blodgett's technique (referred to as the LB technique hereinafter) on a surface of a plane electrode of Au. A bit is written by changing the resistance value of the organic layer by the above-discussed application of the voltage pulse. In this embodiment, the resistance value is lowered by that application, and a reproduction tunneling current increases at the position of the bit.

Structure and operation of the tracking control unit, which is a characteristic portion of the present invention, will be described.

FIG. 2 illustrates the structure of the tracking control unit. The tunneling current signal input into the tracking control unit 107 is supplied to an image generator 1202 and a tunneling current image is formed therein. The tunneling current image is supplied to a next-stage bit extraction unit 1203, and bit data is detected from the tunneling current image therein.

The bits act as data by their positions and presence (or absence), and the bit extraction unit 1203 searches both of them. The bit data extracted by the bit extraction unit 1203 is supplied to a bit-row tilt detection unit 1204, and the tilt of the detected bit row is calculated therein. After the tilt of the bit row is detected, a bit-row interval detection unit 1205 detects the interval between the bit rows, using the data of the tilt. Then, those data is supplied to a correction-amount calculator unit 1206, and the correction amount for tracking is obtained therein. The correction amount is added to a scan signal by a scan-control signal generator 1207, and the scan is caused to track the bit row. The above-noted mechanisms are controlled by a control unit 1201.

The operation of the tracking control unit 107 will be described with reference to FIGS. 3A, 3B, 4A and 4B. Initially, the control unit 1201 supplies a correction order or instruction to the image generator 1202 and the scan-control signal generator 1207 to start the tracking control unit 107. Upon receiving the order from the control unit 1201, the scan-control signal generator 1207 outputs the scan signal for detecting the correction amount. The scan-control signal generator 1207 generally outputs the scan signal for reading data as illustrated in FIG. 3A. In the case of data reading, since the bit row only needs to be scanned, the scan in the Y-direction is performed in a stepwise manner with the bit row interval and its step amount is as shown by ΔY in FIG. 3A.

Figure 3B:
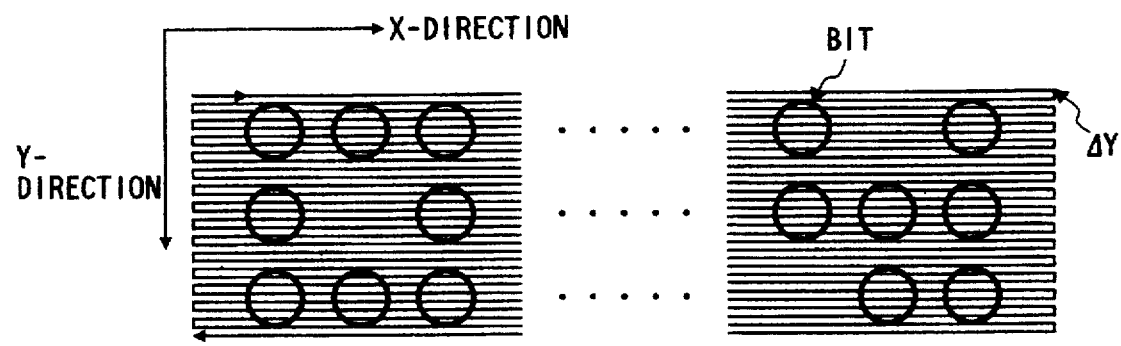

The scan signal for detecting the correction amount measures the tilt of the bit row and the interval between the bit rows, so that the move amount in the Y-direction scan is small as illustrated in FIG. 3B. In this embodiment, this move amount is set to about an eighth (⅛) of the bit diameter. Further, the output time interval of this scan signal is from the output of the correction order or instruction until the time when three arrays of the bit rows are fully detected. Further, in this embodiment, time intervals between the outputs of the correction order are set equal to each other by arranging a time measuring unit.

In this embodiment, the Y-directional move amount of the scan signal for calculating the correction amount is set to an eighth of the bit diameter, but it is possible to increase this move amount up to a half (½) of the bit diameter where noise components of the detection signal and the like are small and where the intervals between the bit rows are small.

Further, the correction orders are output at an equal time interval in this embodiment, but the correction orders can be output on the basis of the number of the bit rows, for example, every a thousand bit rows. In this case, a counter is provided for counting the number of the bit rows.

The image generator unit 1202 executes the binarization process of the tunneling current signal obtained by that scanning, using a predetermined reference value. Thus, binarized image is obtained. An example of the binarized image is illustrated in FIG. 4A. Blank portions are places where the tunneling current signal is larger than the reference value, while black portions are places where the tunneling current signal is smaller than the reference value. Since a large tunneling current signal can be obtained at the bit portion as discussed above, this portion is white in the binarized image. The thus-obtained binarized image is supplied to the next-stage bit extraction unit 1203, and information of the bit positions is detected. In this embodiment, a weight of 1 (one) is imparted to the portion (the white portion in FIG. 4A) where the signal is larger than the reference value, and a weight of zero is imparted to the portion (the black portion in FIG. 4A) smaller than the reference value. A gravity-center portion of the bit portion is used as the bit position. The thus-obtained bit positions are represented by points of o, a, a', b and b' in FIGS. 4A and 4B, for example. This position is expressed by the pixel number in the X-direction and the raster number in the Y-direction with an upper-left position of the scan area in FIG. 4A being a reference point, and the output of this position data is supplied to the next stage. For example, the point a in FIG. 4A is represented by (X, Y)=(143, 8). Here, a white portion, the entire bit of which does not fall within the scan area, is not calculated as a bit.

Then, the bit data is supplied to the bit-row tilt detection unit 1204. In the tilt detection unit 1204, the scan direction and a relative tilt of the array of the bit row are calculated from the supplied bit position data. More specifically, this calculation is executed by obtaining the points o and a illustrated in FIG. 4A. As the point o, a point is selected, which is the closest to a center of the scan area in the Y-direction and a left-most point (the closest to O regarding the X-directional position). Then, the point a is sought under the condition under which the tilt of the bit row is less than a value which permits the distance between opposite bits in the Y-direction to be larger than the interval between the arrays of the bit rows. This condition is attained by increasing the correction times of the tracking, regulating the control method (for example, using a PID control), or the like. For example, in order that the tilt will not be larger than a given value even if the tilt tends to be larger, the tracking correction is performed at the time interval appropriately set to a short period. The number of points considered as the point a is at most two (in FIG. 4A, points a and a', and in the case of one, this very point is decided as the point a), and either of them falls on the same bit row as the point o. FIGS. 5A and 5B illustrate coordinates with the point o as an origin and the respective bit positions represented by black and blank circles. When forming a triangle which has a vertex of the point o and two sides having slopes of (the bit row interval/the X-directional scan width) in consideration of the above-discussed limitation of the bit row tilt, the point a falls within an area of this triangle. Then, when a similar triangle having a vertex of the point a is formed, the bit row including the point o comes into an overlapping portion of those two triangles. In FIG. 5A, points in the bit row including the point o are represented by black points. Slopes of lines formed by connecting the point o or the point a and the respective black points are equal to each other (i.e., all the black points are present in the same bit row). In a case of FIG. 5B, however, slopes of lines formed by connecting the point o or the point a' and respective black points in an overlapping portion of thus-formed two triangles are not equal to each other (i.e., the slopes change from a positive to a negative or vice versa), depending on the bit row to which the black point belongs. Hence, it can be recognized that the point a' is not present in the same bit row as the point o. FIGS. 5A and 5B show the cases where the bit row tilts leftward. Also in cases where the bit row tilts rightward as illustrated in FIG. 4B, the point b can be sought in a similar manner.

By the above-discussed method, the point a and the tilt of the bit row (hereinafter referred to as A) can be found at the same time. In this embodiment, the tilt of the bit row is obtained as an average among the slopes of lines between the point o and each of the black points in the scan area. The tilt of the bit row, however, may be a slope of a line approximated by a method of least squares using X and Y data of the black points and the points o and a. The slope of the bit row and coordinates of the point a' with the point o as an origin are supplied to the next-stage bit-row interval detection unit 1205. Since the point a' has been found to be present in an adjacent bit row, the bit row interval (hereinafter referred to as d) can be obtained from a distance Q between the point o and the point a', the slope B of the line between the point o and the point a' and the slope A as follows:

$$d=l\sin(\beta-\alpha)$$

where $\alpha=\tan^{-1}A$ and $\beta=\tan^{-1}B$.

Then, the next-stage correction-amount calculator unit 1206 receives the relative tilt $\alpha$ between the bit row and the X-scan direction and the bit row interval d which are obtained by the bit-row tilt detection unit 1204 and the bit-row interval detection unit 1205 as discussed above. The correction-amount calculator 1206 searches the correction amount, by which the scan operation is to be actually modified, on the basis of the values of $\alpha$ and d supplied thereto. In this embodiment, a piezoelectric actuator is used as the scanning drive mechanism, and motions in the X-direction and the Y-direction can be controlled independently. When the scanning drive signals to be supplied to the actuator are expressed by Vx and Vy, $$Vx=ax(Lm \cos\theta \ e \sin fmt+Ls \sin\theta \sin fst)$$

$$Vy=ay(Lm \sin\theta \sin fmt+Ls \cos\theta)$$

where fm is the scan frequency in the main-scan direction in the direction of tilt $\theta$, fs is the scan frequency in the sub-scan direction and ax and bx are constants and when the scans in the main-scan direction and the sub-scan direction are respectively performed at widths of Lm and Ls. Since the sub-scan in the Y-direction is displaced in a stepwise manner at opposite ends of the main scan in this embodiment, the scanning drive signals at the time of scanning the m-th raster are actually given by:

$$Vx=ax(Lm \cos\theta \sin fmt+mD\sin\theta)$$

$$Vy=ay(Lm \sin\theta \sin fmt+mD\cos\theta)$$

where D is the interval between the bit rows. Here, $\theta$ in the above formulae is corrected by $\alpha$ to correct the tilt amount, and D is corrected by d to correct the interval.

In this embodiment, the correction order is output from the control unit 1201 with a constant time interval, and the control is performed such that the correction-amount calculator 1206 executes the respective corrections by the PID control. The actual correction amounts $\Delta\theta$ and $\Delta\theta$ are given by:

$$\Delta D(n)=\Delta D(n-1)+KD_1d(n)+KD_2d(n-1)+KD_3d(n-2)$$

$$\Delta\theta(n)=\Delta\theta(n-1)+K\theta_1\alpha(n)+K\theta_2\alpha(n-1)+K\theta_3\alpha(n-2)$$

where (n), (n−1) and (n−2) respectively indicate respective values at the time of n-th, (n−1)-th and (n−2)-th corrections, and $KD_1$, $KD_2$, $KD_3$, $K\theta_1$, $K\theta_2$ and $K\theta_3$ are constants. Parameters of each control can be adjusted by adjusting those constants.

In this embodiment, the above-mentioned PID control is used, but different control methods, such as a fuzzy control, can be utilized without any other change in construction. Further, where a shift in the tracking is small and there is no need to frequently make corrections in the scanning drive, the above PID control can be replaced by a simple P control, or the timing control can be selected such that the correction is executed only at the time the error rate of data reading in the data extraction process unit 111 illustrated in FIG. 1 becomes large.

An example of reading and reproduction control using this embodiment will be described.

The medium has a structure in which six layers of polyimide, which is organic polymer having conjugated π-electron group organic compound, are laminated by the LB technique on a surface of a plane electrode of Au. The probe has a probe tip of Pt. Data is written performed by forming bits using a triangular pulse with a peak value of 3 V, and the recorded bits are read by the bias-applied scanning with a voltage of 2 V (DC). Further, the time interval for the tracking correction is five (5) seconds, and the correction amount is produced by the PID. The scan frequency at this time is 600 Hz which corresponds to 100 kbps when reduced to the bit transfer rate. As a result, the speed was more than ten times faster than the conventional case in which each bit row was scanned a plurality of times and the bit extraction was executed using the picture image. The error rate was substantially the same as the conventional method. This embodiment is directed to an information recording and reproducing apparatus using the tunneling current. Regarding the tracking control mechanism of this invention's characteristic portion, however, physical phenomenon to be measured is not limited to current. It is apparent from the construction and the like that the physical phenomenon may be any phenomenon, such as interatomic force and magnetic force, that occurs by bringing two objects close to each other.

Embodiment 2

In Embodiment 2, the tracking correction as discussed in Embodiment 1 is manually performed. The construction is the same as illustrated in FIG. 1, and the control unit 1201 in FIG. 2 includes a portion having an external signal input means for receiving the correction timing from the outside, such as an operator. Elements, such as the drift, of the piezoelectric actuator are relatively small when the system stably operates, so that there is a case where the automatic correction as discussed in Embodiment 1 need not be frequently carried out. In such a case, it is possible to take in data without errors for a relatively long time after the correction is once executed at an initial stage of the data reading. This embodiment is directed to an example in which the correction instruction is output from the outside at a starting point of data reading and the data is then read.

Similar to Embodiment 1, the medium has a structure in which six layers of polyimide, which is organic polymer having conjugated π-electron group organic compound, are laminated by the LB technique on a surface of a plane electrode of Au. The probe has a probe tip of Pt. The data writing is performed by forming bits using a triangular pulse with a peak value of 3 V, and the recorded bits are read by the bias-applied scanning with a voltage of 2 V (DC). As a result, for about five minutes (corresponding to 30 Mbits from the beginning) after the correction, data can be read at a low error rate even when any corrections are not executed thereafter. Therefore, it can be seen that when the system stably operates, data of about 2 Mbytes can be read with a low error rate only if the tracking correction is once performed immediately prior to the data reading. In this case, the control operation is carried out by the P control.

Embodiment 3

A recording and reproducing apparatus of Embodiment 3 will be described with reference to FIG. 7. A plurality of probes 205 are arranged such that tips 204 thereof come in contact with a record medium 203 including a record layer 202 formed on an electrically-conductive substrate 201. The probe tips 204 of the probes 205 are respectively supported by elastically-deformable bodies 206 that are flexible. Contact force of the probe tip 204 to the record medium 203 amounts to about $10^{-7}$ [N] when an elastic constant of the elastic body 206 is 0.1 [N/m] and the amount of elastic deformation is about 1 [μm].

An xyz drive mechanism 207 receives a position control signal from a position control circuit 213 controlled by a control computer 214, and drives an xyz stage 208 to which the record medium 203 is mounted. Thus, the record medium 203 is moved relatively to the probes 205 in a three-dimensional manner. The xy-directional and z-directional positions of the probes 205 relative to the record medium 203 are adjusted such that the probe tips 204 are located at desired positions on the record medium 203 and are in contact with the record medium 203 with a desired contact force. In the above-discussed recording and reproducing apparatus, when the probes 205 scan the record medium 203, the probe tips 204 of the probes 205 are constantly in contact with the record medium 203.

In such a contact-scan system, when the probe tips 204 scan the record medium 203 while being in contact therewith, even if there appears an uneven portion on the surface of the record medium 203, shock due to the unevenness can be absorbed by the elastic deformation of the elastic body 206. Therefore, the contact force between the probe tip 204 and the record medium 203 is maintained at an approximately constant magnitude, and the probe tip 204 and the surface of the record medium 203 are prevented from being injured. In such a system, there is no need to arrange a piezoelectric element or the like which regulates the positions of respective probe tips in the Z-direction. Therefore, the structure is not complex, and such a system is suitable for an apparatus having a plurality of probes.

Further, no feedback control is needed for adjustment of the Z-directional position of the probe 205 relative to the record medium 203, so that the probe 205 can scan the record medium 203 at high speed.

A record control circuit 211 controlled by the control computer 214 generates a recording signal, and the recording signal is applied to the record medium 203 by the probe tip 204 through a change-over switch 209 which is now switched to the recording system. Thus, recording is locally performed on a portion of the record layer 202 with which the probe tip 204 is in contact. As the record layer 201 in the above-discussed apparatus, used is a material which causes a flowing current to be changed in magnitude depending on the voltage application. For example, used is an LB film (laminated organic single molecular films formed by the Langmuir-Blodgette technique) having an electric memory effect, such as polyimide and SOAZ (bis-n-octyl squarylium azulene) which are disclosed in Japanese Patent Laid-Open Application Nos. 63-161552 and 63-161553. In this material, when a voltage (about 5 V to 10 V) above a threshold is applied across the probe tip, the LB film and the substrate, the electric conductivity of the LB film is changed from an OFF state to an ON state, and hence a current flowing therethrough increases when a bias voltage (about 0.01 V to 2 V) for reproduction is applied thereacross.

As a second example, an amorphous film material, such as GeTe, GaSb and SnTe, may be used. In such material, when a voltage is applied across the probe tip, the amorphous film material and the substrate, the phase transition from amorphous state to crystal state is effected due to heat generated by the flowing current. Hence, the electric conductivity of the material changes, and the current flowing therethrough increases when the bias voltage for reproduction is applied thereacross.

As a third example, an oxidizable metal or semiconductor material, such as Zn, W, Si and GaAs, may be used. In such a material, when the voltage is applied across the probe tip, the oxidizable metal or semiconductor material and the substrate, the material acts with oxygen in the air or water adsorbed into the material surface due to the flowing current and an oxide film is formed on the material surface. Thus, a contact resistance of the material surface changes, and a current flowing therethrough decreases when a bias voltage for reproduction is applied thereacross.

The recorded bits are reproduced in the following manner. After the signal wiring from each probe 205 is changed over to the reproducing system by the switch 209, a bias voltage is applied between the probe tip 204 and the substrate 201 by a bias voltage applying unit 210. Current flowing thereacross is detected by a reproduction control circuit 212. More or less current flows through a portion of the recorded bit on the record medium 203 than through an unrecorded portion. The reproduction control circuit 212 detects the difference in the flowing current, and supplies this difference signal to the control computer 214 as a reproduced signal. At the same time, a positional deviation control circuit 215 detects the amount of the positional deviation of the probe 205 relative to the recorded bit on the record medium 203, on the basis of the signal from the reproduction control circuit 212, and the control circuit 215 controls the position control circuit 213, the xyz driving mechanism 207 and the xyz drive stage 208 such that the positional deviation is corrected.

Figure 8:
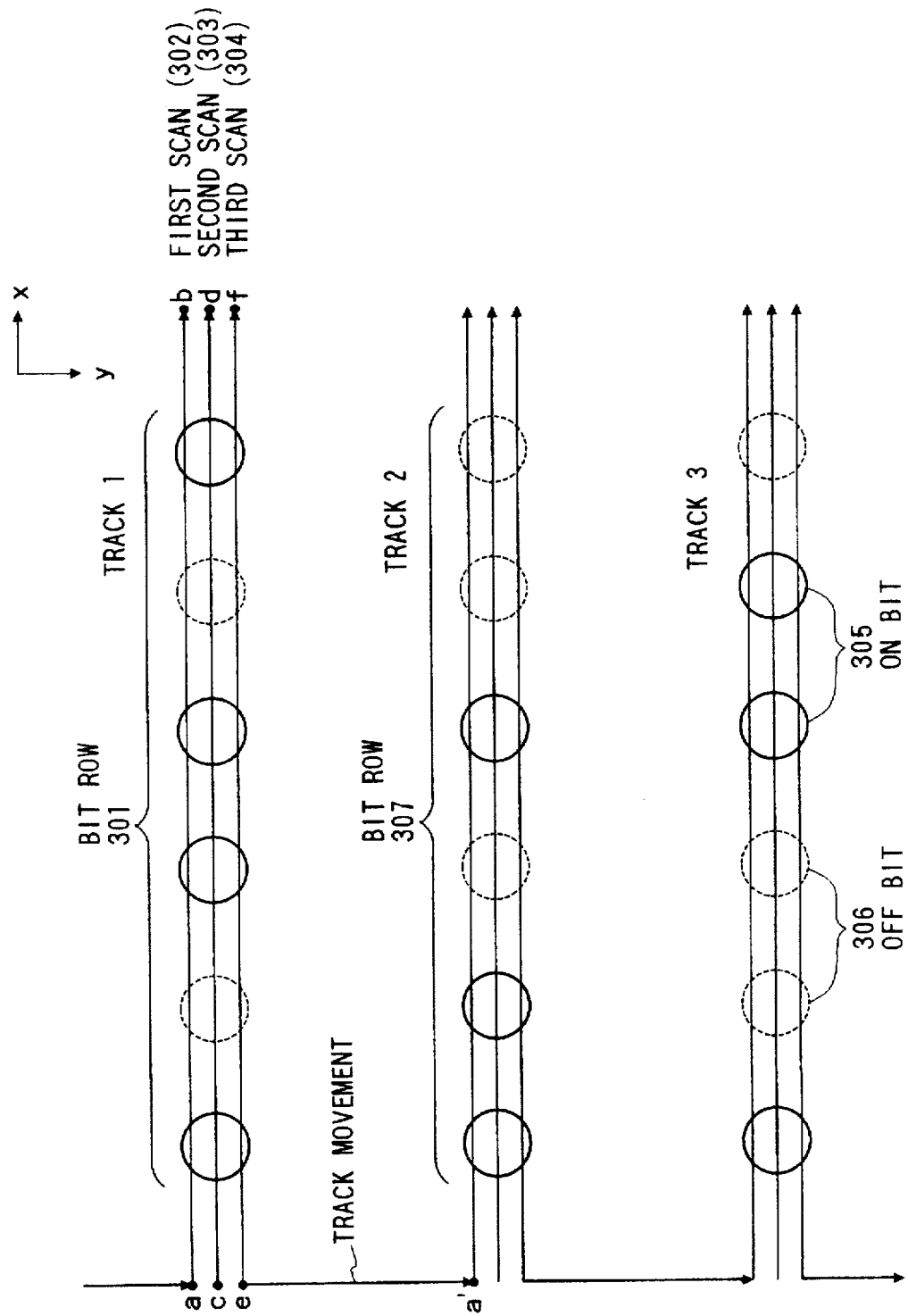
FIG. 8 is a view illustrating a plurality of scans of a probe in a raster scanning system.

As illustrated in FIG. 8, a plurality of scans (three or more than three) are performed to a bit row 301 arrayed in the X-direction on a track 1 by shifting the scan line in the Y-direction bit by bit. Thus, the recorded bits (i.e., ON bits 305 indicated by solid lines) are detected. Circles indicated by phantom lines are OFF bits 306 in which no bit is recorded. This embodiment shows an example in which three scans of the first scan 302 (a→b), the second scan 303 (c→d) and the third scan 304 (e→f) are carried out. The respective scan positions shift from each other in the Y-direction by about one n-th of the recorded bit diameter (n is less than ten, more specifically several). After three scans are executed to the bit row in the X-direction, the track is moved in the Y-direction and a bit row 307 on a track 2 is scanned. This operation is repeated such that all the bit rows are scanned.

Figure 9:
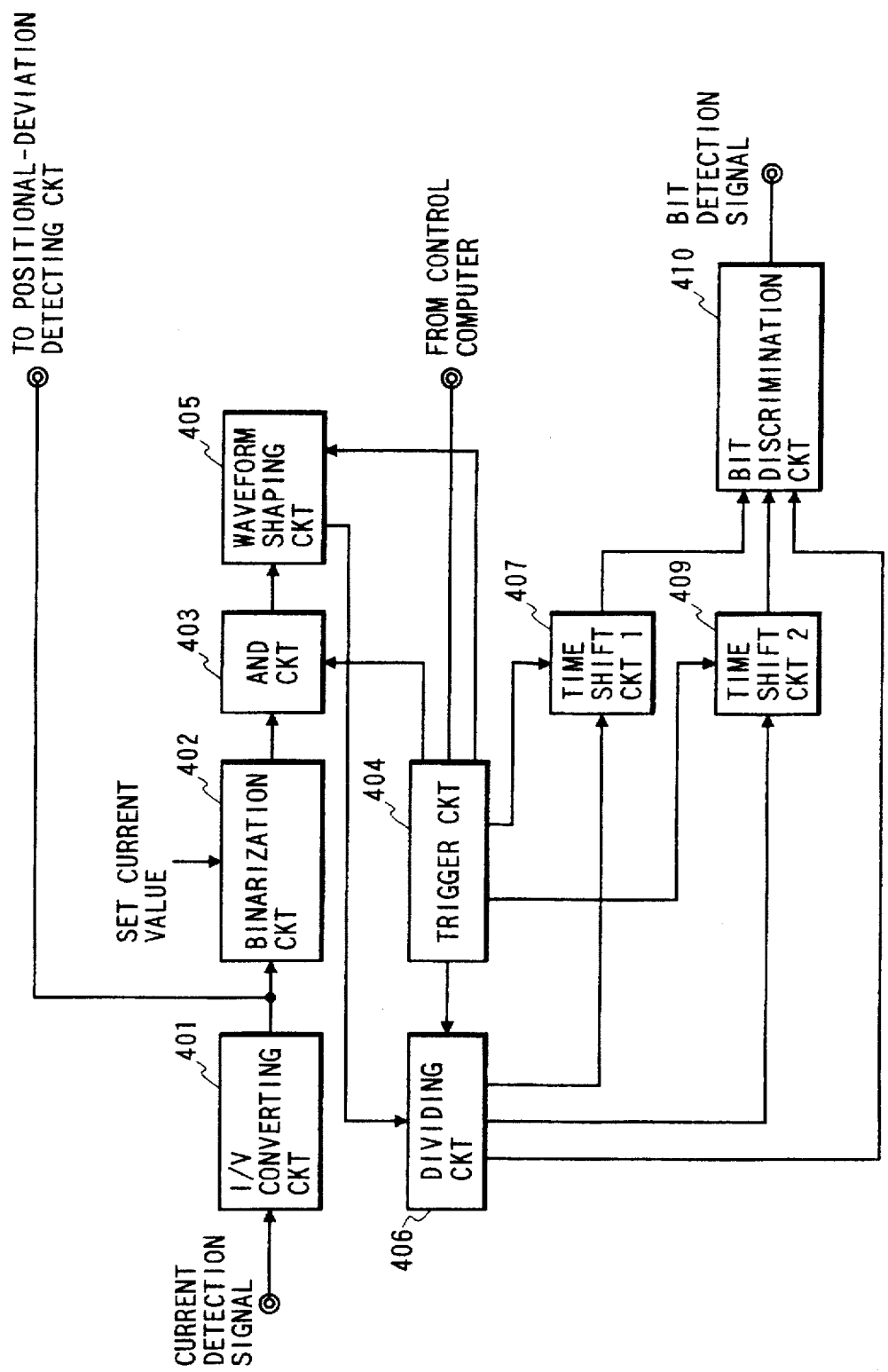
FIG. 9 is a block diagram illustrating a reproduction control circuit in the above-mentioned recording and/or reproducing apparatus.

The reproduction control circuit for performing the bit detection by the plural scans will be described with reference to FIG. 9. FIG. 9 illustrates the structure of the reproduction control circuit 212. In FIG. 9, after an input current detection signal (a bit detection signal) is converted into a voltage signal in an I/V converting circuit 401, the voltage signal is binarized in a binarization circuit 402 with reference to a voltage value corresponding to a predetermined set current value. The other output from the I/V converting circuit 401 is supplied to a positional deviation detecting circuit which will be described later. Then, in an AND circuit 403, obtained is a logical product between the binarized signal and a bit detection synchronization signal which is output from a trigger circuit 404 and synchronized with a timing of bit detection. Thus, non-synchronized noises, which are superimposed on the binarized signal, are removed. The logical product signal is input into a waveform shaping circuit 405 and shaped therein using a synchronization signal for waveform shaping which is supplied from the trigger circuit 404. The thus-shaped signal is input into a dividing circuit 406 and divided into three portions on the basis of synchronization signals which are output from the trigger circuit 404 in synchronization with the first, second and third scan timings. The first divided signal is input into a time shift circuit 1 (407) which is constructed by a shift register and the like, and the signal waveform thereof is shifted toward a time-delay direction by a time difference between the first scan and the third scan. This signal is input into a bit discrimination circuit 410. The second divided signal is input into a time shift circuit 2 (409), and the signal waveform is shifted toward a time-delay direction by a time difference between the second scan and the third scan. Then, this signal is input into the bit discrimination circuit 410. The third divided signal is input into the bit discrimination circuit 410 without any change.

The bit discrimination circuit 410 discriminates and detects a true bit based on the three input signals which are harmonized such that the first, second and third scans are in the same timing. The detected signal is output therefrom as a reproduced signal. An example of the bit discrimination circuit 410 is composed of three OR circuits and one AND circuit. For the above-discussed three input signals, three kinds of logical sums between two of the respective signals are obtained by the OR circuits, and output signals of these logical sums are input into the AND circuit to obtain a logical product thereof. Thus, this logical product may be used as the output of the bit discrimination circuit 410. During the above-discussed process, each bit row is scanned three times, and a real bit is judged to be present when the bit is detected twice or more.

The positional deviation detection or control circuit for performing the tracking in the plural-scan system of Embodiment 3 will be described with reference to FIG. 10.

Figure 10:
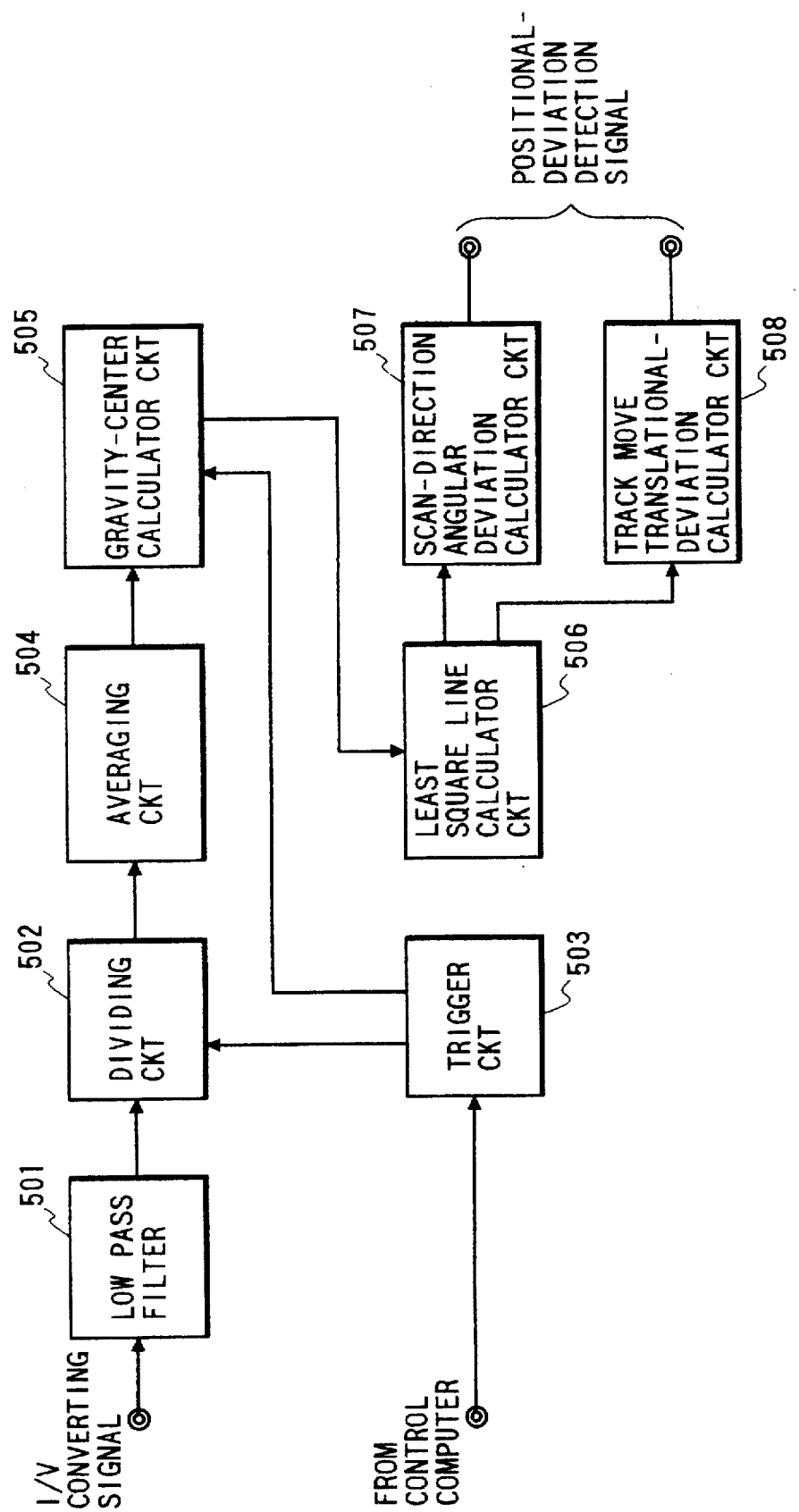
FIG. 10 is a block diagram illustrating a positional deviation detecting circuit in Embodiment 3 of the present invention.

FIG. 10 illustrates the structure of the positional deviation detection circuit 215 in FIG. 7. In FIG. 10, an envelope signal of the bit detection signal of a high-frequency component is obtained by a low pass filter 501 from the I/V converting signal input from the reproduction control circuit 212. Then, each scan (in this embodiment, each of the first, second and third scans) is divided into an equal number (in this embodiment, a four-divided example is illustrated) of time blocks in a dividing circuit 502, by using a signal corresponding to the scan which is output from a trigger circuit 503 controlled by the control computer. The time sharing of the envelope signal is performed in the dividing circuit 502, corresponding to the time blocks. The divided envelope signal from the dividing circuit 502 is input into an averaging circuit 504, and an time-averaged signal of the divided envelope signal is obtained in each time block.

The time-averaged signal is input into a gravity-center calculator circuit 505, and the Y-directional position of a gravity center of the time-averaged signal intensity is calculated in each time block for each of the plural scan positions deviated in the Y-direction from each other. The amount of the Y-directional gravity center position in each time block, which is output from the gravity-center calculator circuit 505, is input into a least-square line calculator circuit 506. In the least-square line calculator circuit 506, calculated is a least square line which passes the Y-directional gravity center in each time block. The tilt amount of the least square line is input into a scan-direction angular deviation calculator circuit 507, and the angular deviation amount of the probe's scan-direction relative to the bit-row direction is calculated therein. A y-intercept value of the least square line is input into a track-move translational-deviation calculator circuit 508, and the Y-directional translational deviation amount, which occurs as the probe track is moved relative to the bit row, is calculated therein. The thus-obtained positional deviation amounts (the angular deviation amount and the translational deviation amount) of the probe relative to the bit row are supplied to the position control circuit 213, and the correction of the positional deviation of the probe scan relative to the bit row (i.e., the tracking control) is executed.

Figures 6A, 6B, 6C, 6D:
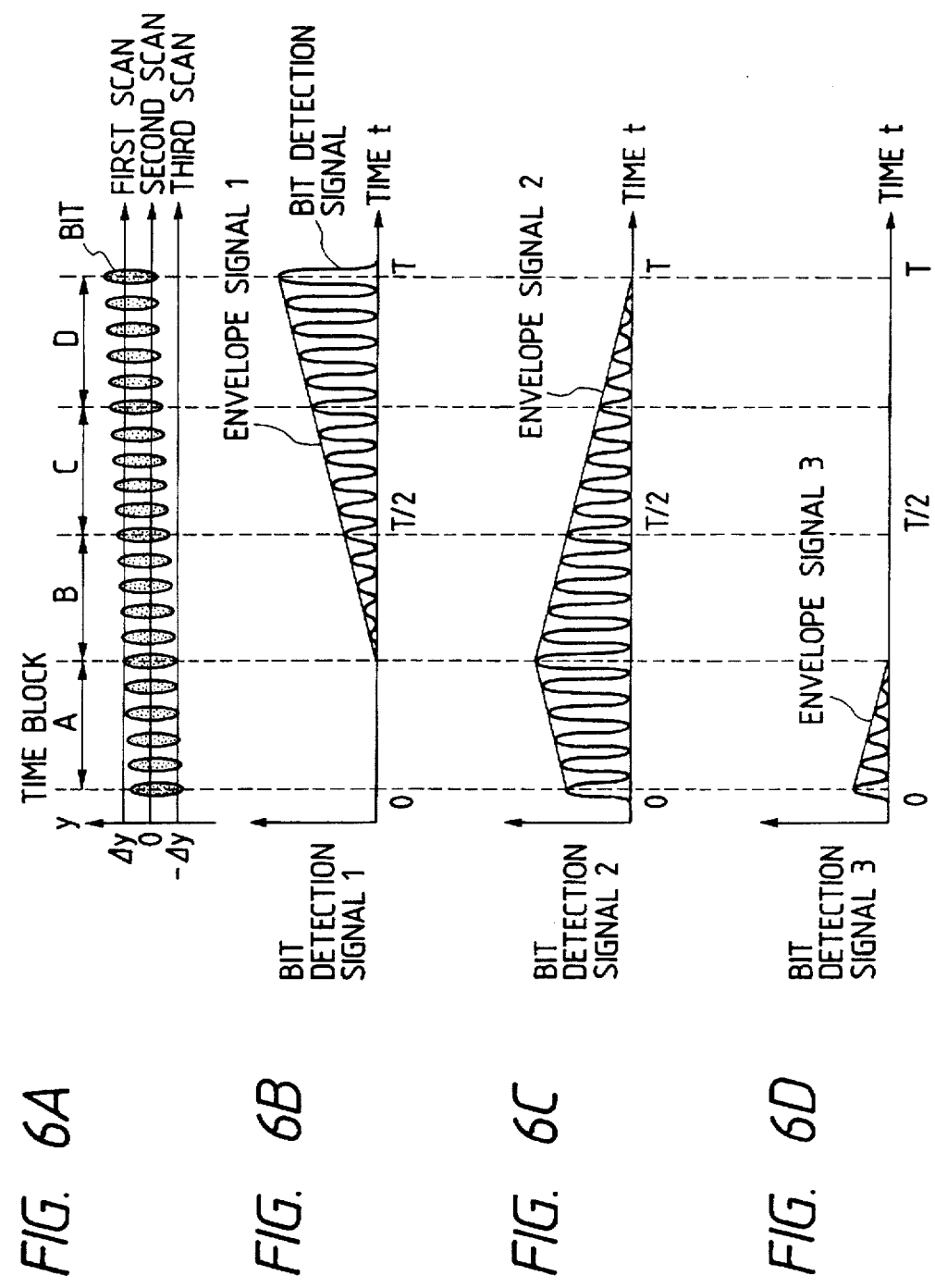
FIGS. 6A, 6B, 6C and 6D are respectively views illustrating processed shapes of signals for detecting probe scan and positional deviation in Embodiment 3 where the positional deviation of a probe exists relative to the bit row.

A specific signal waveform process in the positional deviation detection circuit will be described with reference to FIGS. 6A to 6D. FIG. 6A illustrates an example of the plural scans of the probe which has the angular deviation relative to the bit-row array direction and the Y-directional translational deviation. In such a case, bit detection signals (current detection signals) 1 to 3 obtained in the first, second and third scans are as illustrated in FIGS. 6B, 6C and 6D. Those scans are shifted by $\Delta y$ in the y-direction. For simplicity, time abscissae (O to T) of the waveform in the respective scans are coincident with each other, but actually the respective scans are not simultaneously performed and hence the time abscissae are deviated from each other by the time difference in scan.

Further, in FIG. 6A, the y-direction is expanded in comparison with the x-direction, so that the bit shape is illustrated as an ellipse. In FIGS. 6B to 6D, the envelope signals 1 to 3 of the bit detection signals are indicated by solid lines, and the envelope signals 1 to 3 are divided into four time blocks A to D of t=0 to T/4, T/4 to T/2, T/2 to 3T/4 and 3T/4 to T. In this embodiment, the signal intensity of the envelope signal 1 increases in the order of the time blocks B, C and D. The signal intensity of the envelope signal 2 is maximum between the time blocks A and B and decreases in the order of the blocks B, C and D. The signal intensity of the envelope 3 has a small value in the time block A and is zero in the time blocks B to D.

From the above data, the following facts can be known. In the start position zone (corresponding to the block A) of each scan, the y-directional center position of the bit row is between the y-directional probe positions in the second and third scans and is closer to the second scan. In the scan position zone corresponding to the block B, the bit-row center is between the first and second scans and closer to the second scan. Further, in the time blocks C and D, the bit row center moves closer to the first scan. Thus, the positional deviation of the probe scan relative to the bit row can be detected by comparing the signal intensities of the envelope signals 1 to 3 in each time block.

Figure 11A:
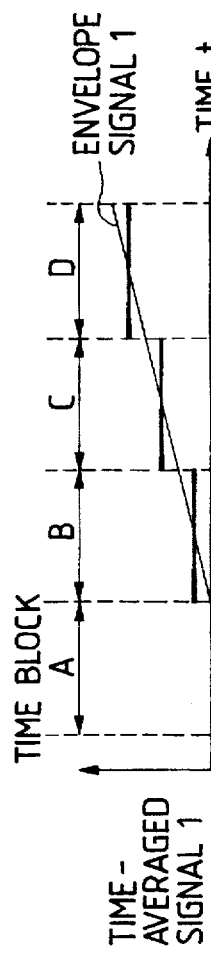
FIGS. 11A, 11B, 11C and 11D are respectively views illustrating processed shapes of signals for detecting the positional deviation.
Figure 11B:
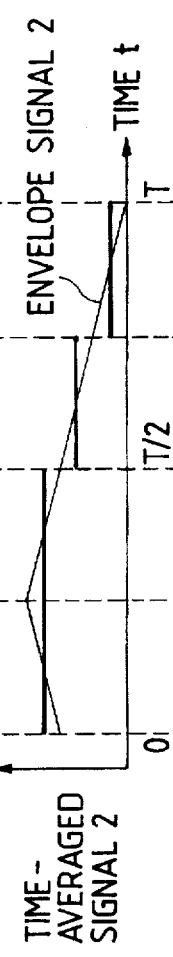
Figure 11C:
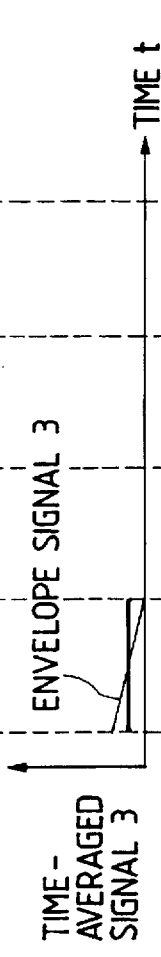
Figure 11D:
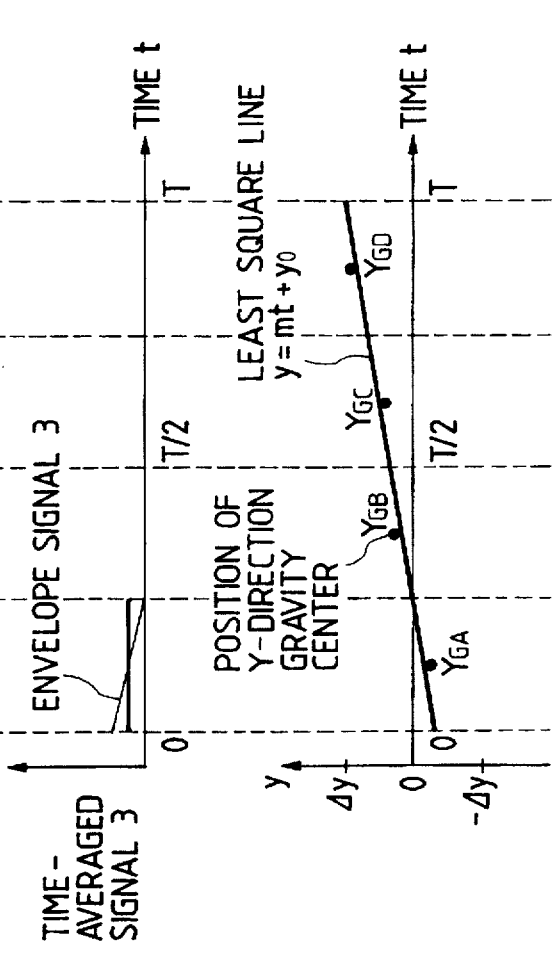

Hereinafter, a method of calculating a specific positional deviation amount from the divided envelope signal, corresponding to each time block, will be described. FIGS. 11A to 11C illustrate the time-averaged signals of the divided envelope signals 1 to 3 in the respective time blocks A to D. Then, calculated are the gravity centers in the y-directional position of the first, second and third scans of the time-averaged values in each time block. When the y-directional positions of the first, second and third scans are respectively indicated by $y=+\Delta y$, O and $-\Delta y$, the time-averaged signal intensities of the first scan in respective time blocks are indicated by S1A, S1B, S1C and S1D, the time-averaged signal intensities of the second scan in respective time blocks are indicated by S2A, S2B, S2C and S2D and the time-averaged signal intensities of the third scan in respective time blocks are indicated by S3A, S3B, S3C and S3D, the gravity centers in the time blocks A, B, C and D are respectively given by:

$$YGA=\{(+\Delta y)\cdot S1A+O\cdot S2A+(-\Delta y)\cdot S3A\}/(S1A+S2A+S3A)$$

$$YGB=\{(+\Delta y)\cdot S1B+O\cdot S2B+(-\Delta y)\cdot S3B\}/(S1B+S2B+S3B)$$

$$YGC=\{(+\Delta y)\cdot S1C+O\cdot S2C+(-\Delta y)\cdot S3C\}/(S1C+S2C+S3C)$$

$$YGD=\{(+\Delta y)\cdot S1D+O\cdot S2D+(-\Delta y)\cdot S3D\}/(S1D+S2D+S3D)$$

Then, an approximate line is calculated by the least square method for the respective gravity center positions YGA to YGD relative to positions on the time abscissa (t). When the slope of the calculated least square line is designated by m and the y-intercept thereof is designated by yO, the line is given by:

$$y=mt+yO$$

When the x-directional scan distance during time O to T is designated by $\Delta X$, the angular deviation amount $\Delta\theta$ of the probe's scan direction relative to the bit-row array direction is given by:

$$\Delta\theta=mT/\Delta X$$

Further, the y-directional translational deviation amount $\Delta Ydev$ of the second probe scan relative to the bit row is gevin by:

$$\Delta Ydev=yO$$

As discussed above, a plurality of probe scans are carried out to a bit row and the bit detection signals are obtained. From those bit detection signals, the angular deviation amount $\Delta\theta$ of the probe's scan direction relative to the bit-row array direction and the y-directional translational deviation amount $\Delta Ydev$ of the second probe scan relative to the bit row can be obtained.

Figure 12:
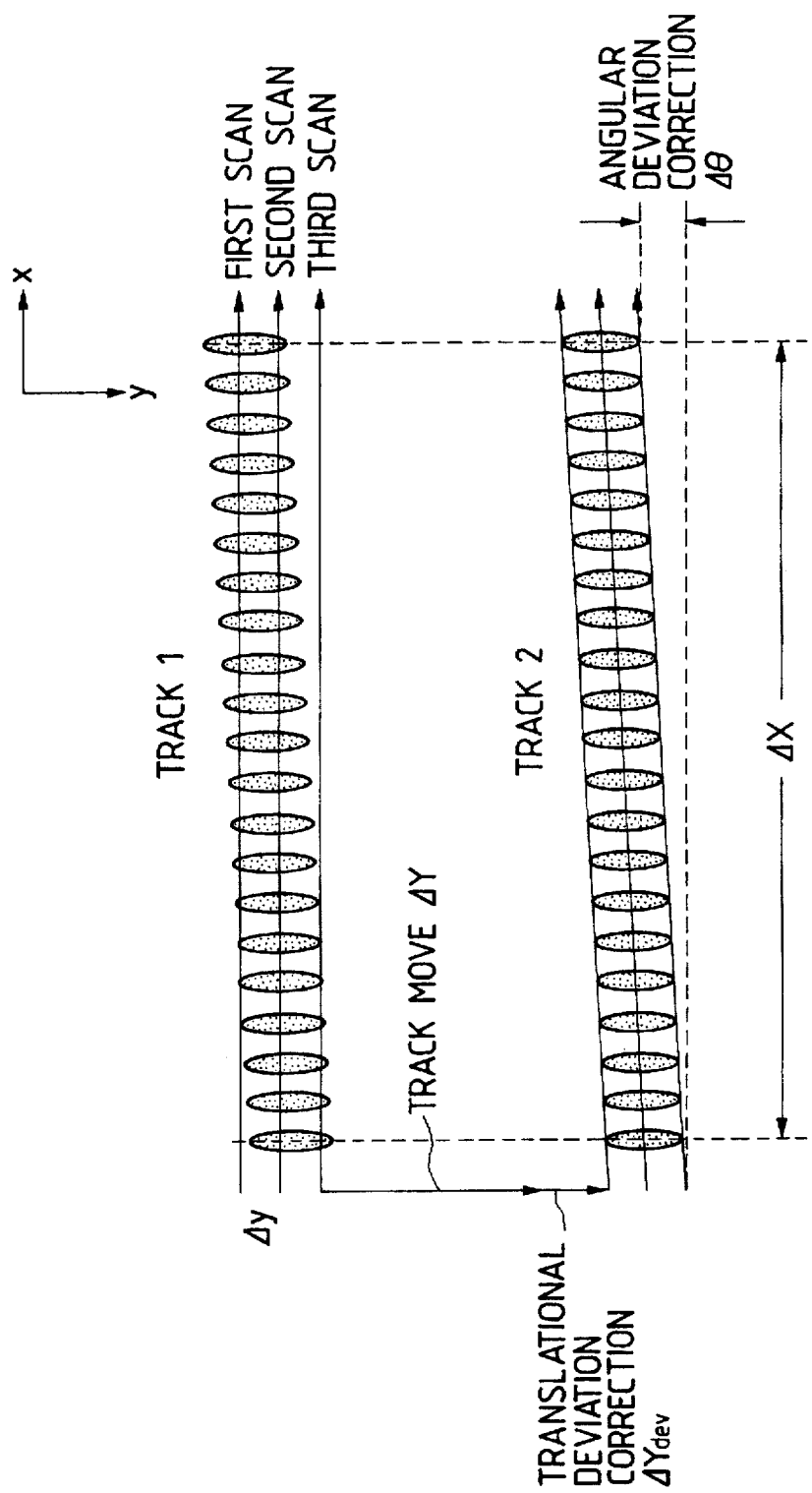
FIG. 12 is a view illustrating a method of correcting the positional deviation.

FIG. 12 shows a manner of correcting the positional deviation.

During the plural scans of the bit row on the track 1, the angular deviation amount $\Delta\theta$ and the translational deviation amount $\Delta Ydev$ are obtained as described above. The plural scans of the bit row on the track 2 are performed after the track movement such that those deviation amounts are corrected. Similar to the above, scans of the bit row on the track n+1 are performed such that the deviation amounts obtained during the plural scans of the bit row on the track n are corrected. The manner of correction may be as follows. First, the positional deviation amounts detected on previously-scanned several tracks are averaged and the correction amounts on a next track are calculated. Second, the averaging is executed by putting the heavier weight on the deviation amount obtained during the newer track in time to calculate the correction amounts. By such a process, influences of error factors in the positional deviation detection, which occur on a certain track incidentally, can be reduced, and a highly-reliable tracking can be attained. Further, the correction amounts on a next track may be calculated taking into account a change with time in the positional deviation amounts detected on the previously-scanned several tracks. By such a process, the tracking can highly precisely follow the change with time in the positional deviation.

In this embodiment, the division number of the time blocks is four, but the number may be increased. The division number can be increased up to the sampling time width of the envelope signal. In this case, it is not proper to say "division", but instead the gravity center is detected in each sampling point. When the division number is increased, precision of the positional deviation detection is improved and the tracking control can be accurately performed. However, it takes much time to process the signals, and the reproduction speed is lowered. In the actual apparatus, an appropriate division number may be selected, considering necessary precision of the positional deviation detection and reproduction speed on the basis on the mechanical characteristics of record medium, probe, electric circuits, apparatus and the like.

In this embodiment, the three scans are performed in the same direction to carry out the bit detection and positional deviation detection. In this case, the entire reproduction speed is decreased since there occur wasteful return scans during which no signal detection is performed. In order to speed up the reproduction speed, the second scan may be performed in a direction opposite to the first and third scan direction and the bit detection signal waveform is then inverted in time, for example. Thus, the bit detection and the positional deviation detection can be achieved even if the plural scans are not performed in the same direction. No wasteful scan time occurs, so that high-speed bit detection and tracking control by the plural scans can be attained.

In the actual apparatus as illustrated in FIG. 7, a piezoelectric element actuator is often used as the xyz driving mechanism 207 for driving the xyz stage 208 in order that the probe 205 can accurately scan the record medium 203. However, characteristics of the applied voltage to the drive amount of the piezoelectric actuator have hysteresis. Therefore, there occurs a difference between the voltage waveform applied to the piezoelectric actuator for the stage drive in the x-direction and the actual waveform of the drive amount of the piezoelectric actuator, so that the waveform processing for the positional deviation detection becomes somewhat complex.

Embodiment 4

In the above-discussed scan system in which x-scan and y-scan are combined, a reciprocal movement between the probe and the record medium is necessarily needed, and the problem of hysteresis occurs when the piezoelectric actuator is used.

Figure 13:
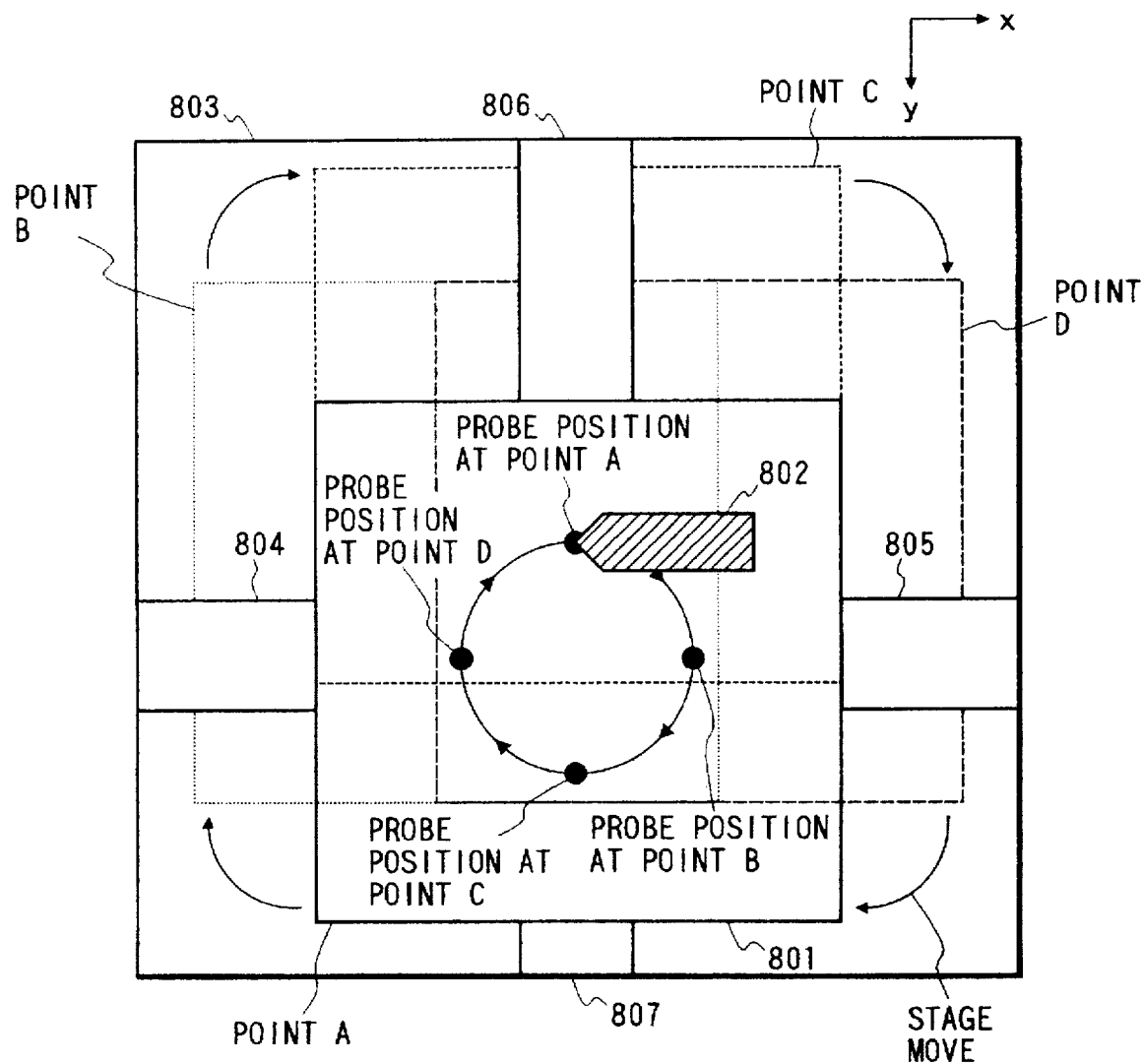
FIG. 13 is a view illustrating a driving manner in a circular scan method.

In order to solve such a problem, there is proposed a circular scan system in which the probe and the record medium are moved circularly (not rotated) relatively to each other. FIG. 13 shows such a circular scan system. The position of an xy stage 801 indicated by a thick solid line is designated by a point A, and positions thereof indicated by three kinds of phantom lines are designated by points B, C and D. A probe 802 is fixed to a housing 803. The xy stage 801 is moved relative to the housing 803 by driving x-directional and y-directional drive mechanisms 804 to 807. Therefore, the xy stage 801 is driven relative to the probe 802. At this time, two sinusoidal-wave drive voltages are respectively applied to the first and second x-directional drive mechanisms 804 and 805. Those sinusoidal waves have the same frequency f and the same amplitude, but polarities thereof are opposite to each other (i.e., their phases are shifted 180 degrees). Similarly, two sinusoidal-wave drive voltages are respectively applied to the first and second y-directional drive mechanisms 806 and 807. Those sinusoidal waves (or cosine waves) have the same frequency f and the same amplitude, but their phases are shifted 90 degrees from those of the sinusoidal waves applied to the x-directional drive mechanisms. Hence, when viewed from the xy stage 801, a tip of the probe 802 is circularly moved on the xy stage 801 as illustrated in FIG. 13. The moving trace of the probe 802 is illustrated in FIG. 13 when the xy stage 801 is moved around the points A, B, C and D. The probe positions are illustrated on the xy stage 801 at the point A. The frequency of the circular scan or the speed of the circular motion can be changed by changing the frequency f. The diameter of the circular scan can be changed by changing the amplitude v.

Figure 14:
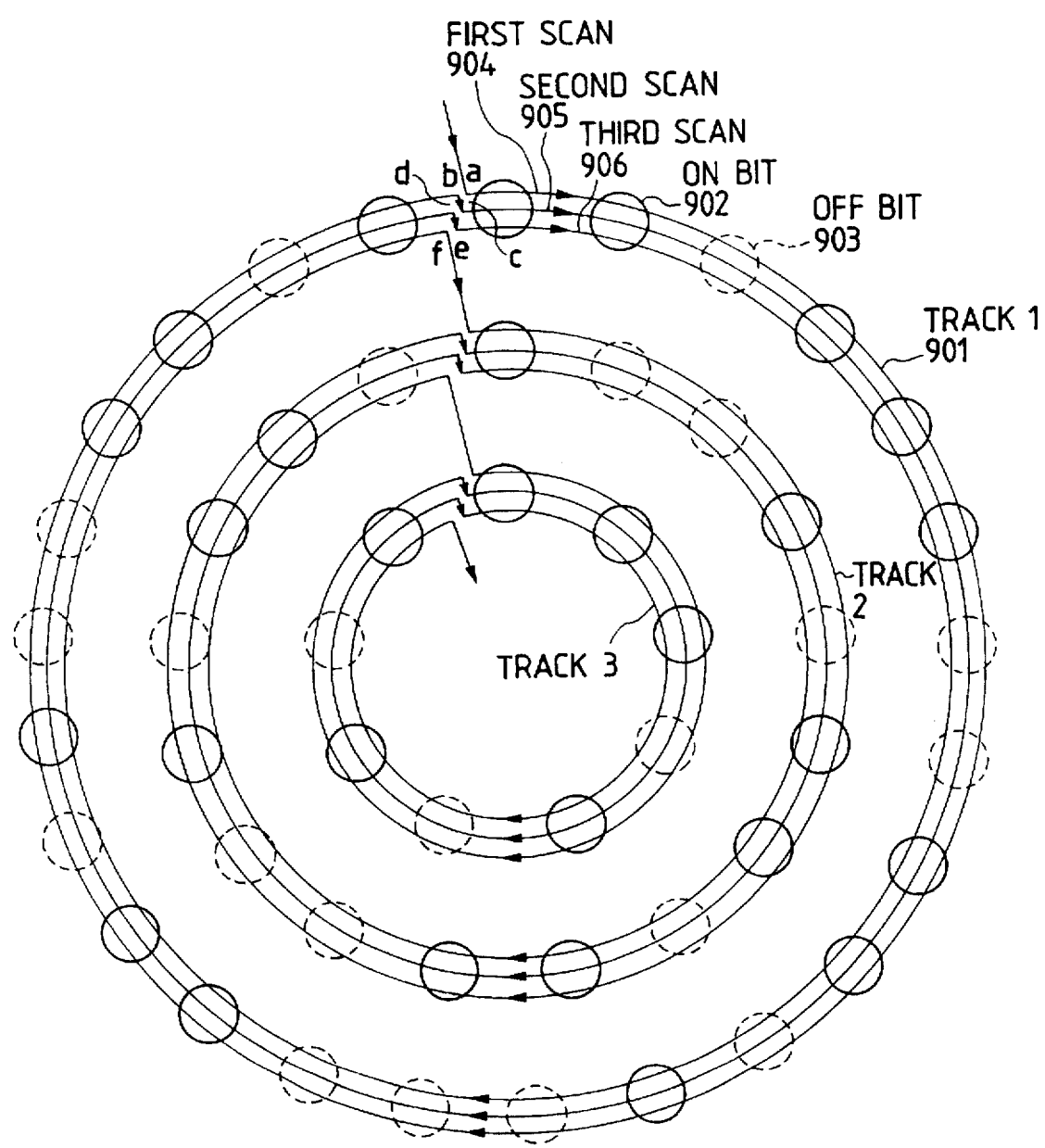
FIG. 14 is a view illustrating a plurality of scans of a probe in the circular scan method.

Embodiment 4 of the above-discussed circular scan system will be described. As illustrated in FIG. 14, a plurality (in this embodiment, three) of circular scans are executed to the circularly-arrayed bit row on a track 1 (901) of plural concentric circular tracks. Those circular scans are shifted by bits in a radial direction. Thus, recorded bits or ON bits 902 indicated by solid lines are detected. The bits indicated by phantom lines are OFF bits 903 in which no bits are recorded. In this embodiment, three scans are performed: first scan 904 (a→b), second scan 905 (c→d) and third scan 906 (e→f). Directions of the first, second and third scans 904, 905 and 906 are the same (in this embodiment, a clockwise direction). The position of each scan (i.e., the diameter of the circular scan) is shifted in a radial direction by about one n-th (n is less than ten, and more specifically several) of the recorded bit diameter (portions of b→c and d→e). After three circular scans are performed to one bit row, the track is moved in the radial direction (f→a') and scans are performed to the bit row on a track 2. All the bit rows are scanned by repeating such operation.

Thus, the bit rows are scanned, and the current detection signal (the bit detection signal) is detected. The reproduction method from the bit detection signal is the same as that of Embodiment 3. The reproduction control circuit of the circular scan system is illustrated in FIG. 9. In the circular scan system, the scan direction is not reversed and no wasteful scan occurs. Further, hysteresis of the piezoelectric actuator is reduced, and no special signal waveform processing is needed even when the drive with complex waveform is not executed. Therefore, high-speed recording and reproduction operation can be attained with a simpler structure than Embodiment 3.

Figure 15:
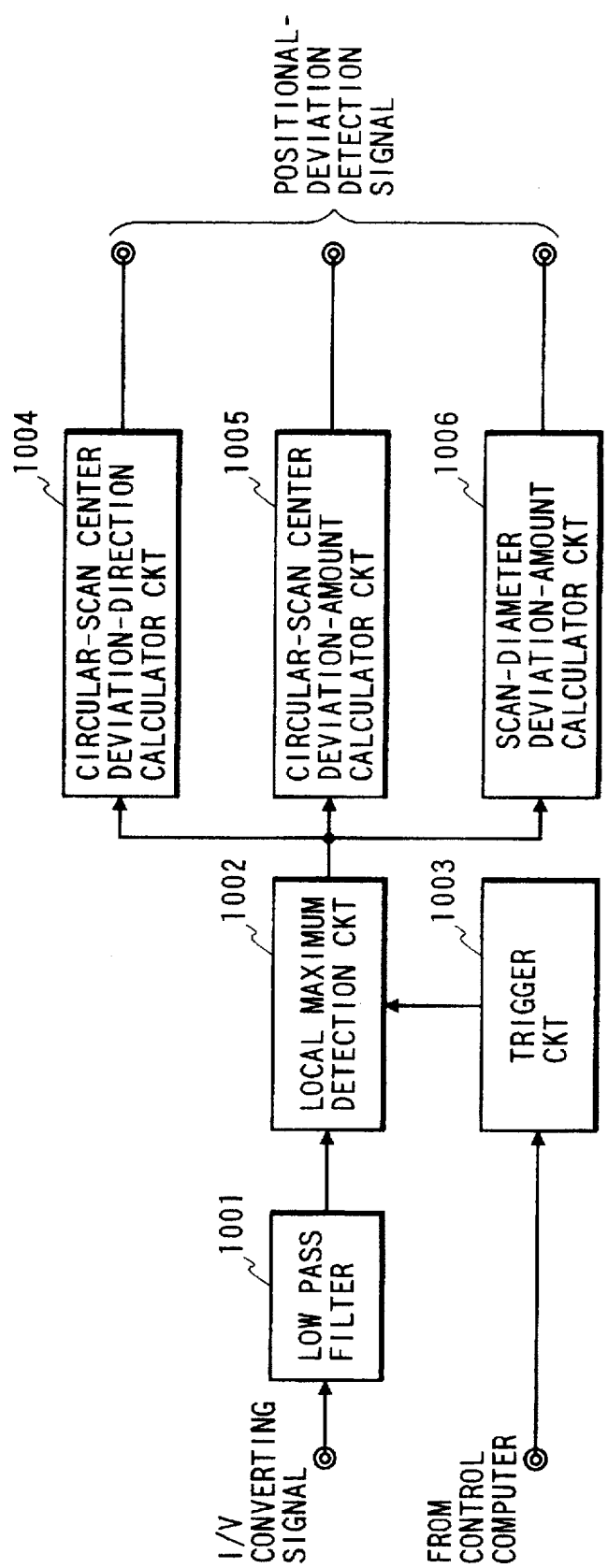
FIG. 15 is a block diagram illustrating a positional deviation detecting circuit in Embodiment 4 of the present invention.

The positional deviation detection circuit for performing the tracking with the plural scans will be described in Embodiment 4 of the circular scan system, with reference to FIG. 15. FIG. 15 illustrates the structure of the positional deviation detection circuit 215 in FIG. 7. In FIG. 15, a low pass filter 1001 produces the envelope signal of the bit detection signal with a high-frequency component, from the I/V converting signal input from the reproduction control circuit. The envelope signal is input into a local maximum detection circuit 1002. In the local maximum detection circuit 1002, the positions on the time abscissa (t) of the local maxima in the envelope signal waveform and the signal intensities of the respective envelope signals are detected using a signal synchronized with the scan and output from a trigger circuit 1003 controlled by the control computer. The thus-detected signal intensities and positions of the local maxima are supplied to a circular-scan center deviation-direction calculator circuit 1004, a circular-scan center deviation-amount calculator circuit 1005 and a circular scan-diameter deviation-amount calculator circuit 1006. In the circular-scan center deviation-direction calculator circuit 1004, a direction of the deviation between the bit-row array center and the probe's scan center is calculated on the basis of the positions on the time abscissa (t) of the local maxima in the envelope signal waveform. In the circular-scan center deviation-amount calculator circuit 1005, the deviation amount between the bit-row array center and the probe's scan center is calculated on the basis of those signal intensities and positions. This deviation amount corresponds to the angular deviation amount $\Delta\theta$ of Embodiment 3. In the circular scan-diameter deviation-amount calculator circuit 1006, the diameter deviation amount between the bit-row array diameter and the probe's scan diameter is calculated on the basis of those signal intensities and positions. The thus-obtained positional deviation amounts (the center deviation amount, the center deviation direction and the diameter deviation amount) between the bit row and the probe scan are supplied to the position control circuit, and correction of the positional deviation of the probe scan relative to the bit row, or the tracking control, is performed.

Figure 16:
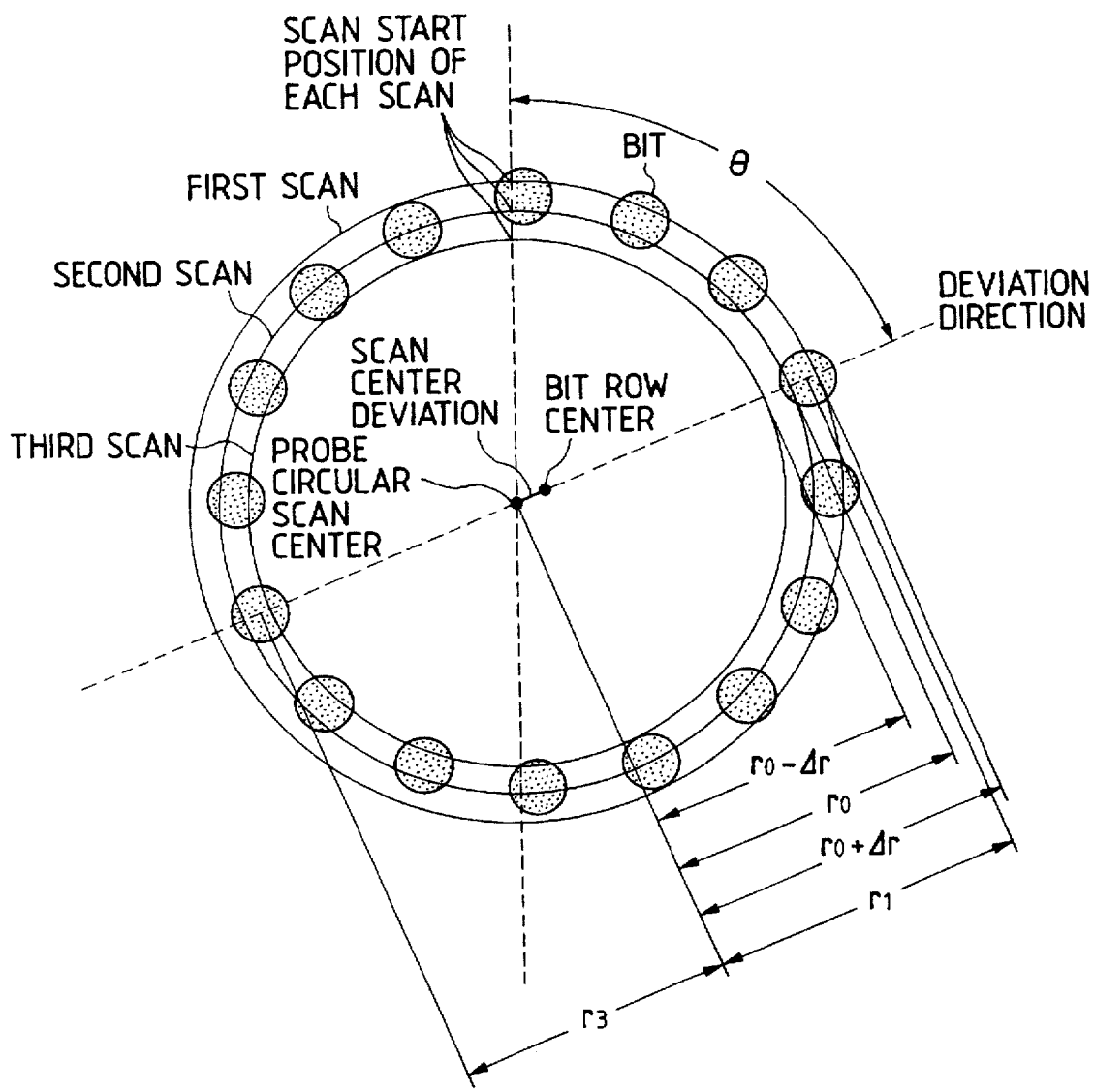
FIG. 16 is a view illustrating a probe scan where the positional deviation of a probe exists relative to the bit row.
Figure 17A:
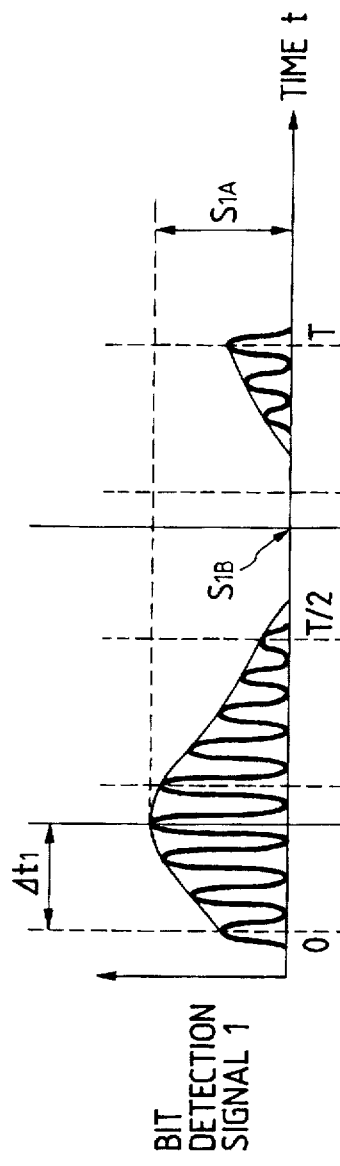
FIGS. 17A, 17B and 17C are respectively views illustrating processed shapes of signals for detecting the positional deviation.
Figure 17B:
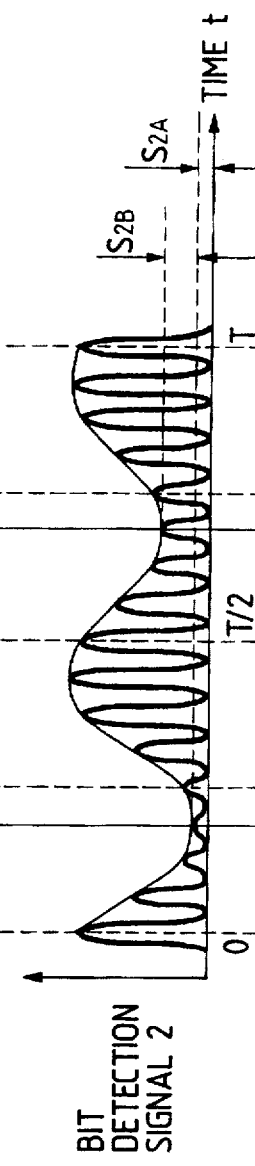
Figure 17C:
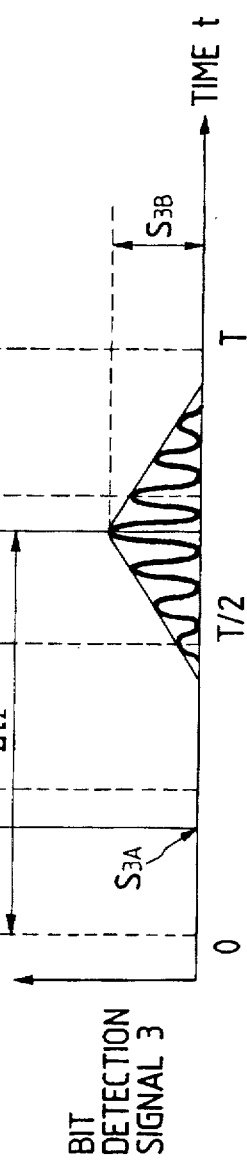

A specific signal waveform processing in the positional deviation-amount detection circuit will be described with reference to FIGS. 16, 17A, 17B and 17C. FIG. 16 shows an example in which the probe position has a scan center deviation and a diameter deviation in a radial direction relative to the bit row array. When the circular scan radius of the second scan and the interval between the scans in a radial direction are respectively denoted by r0 and Δr, the circular scan radii of the first and third scans are given by r0+Δr and r0−Δr. In such a case, bit detection signals (current detection signals) 1 to 3 obtained in the first, second and third scans are illustrated in FIGS. 17A, 17B and 17C. For simplicity, times required for respective scans are assumed to be equal to T and the time abscissae (0 to T) of waveforms in respective scans are made coincident with each other. Actual scans, however, are not contemporaneous, so that the scans are shifted from each other by such time difference. The envelope signals 1 to 3 of the bit detection signals in FIGS. 17A to 17C are indicated by solid lines. In this embodiment, the envelope signal 1 shows its local maximum at t=3T/16. At this point, the signal intensity of the envelope signal 2 is smaller than the local maximum of the envelope signal 1, and the signal intensity of the envelope signal 3 is about zero. The envelope signal 3 shows its local maximum at t=11T/16. At this point, the signal intensity of the envelope signal 2 is smaller than the local maximum of the envelope signal 3, and the signal intensity of the envelope signal 1 is about zero. The local maximum of the envelope signal 1 is larger than the local maximum value of the envelope signal 3. It can be known therefrom that the bit-row center position in the radial direction is between the radial-directional probe positions of the first and second scans and closer to the probe position of the first scan during t=T/16 to 5T/16 (its center: t=3T/16). The bit row center shifts closer to the probe position of the second scan during t=5T/16 to 9T/16 (its center: t=7T/16). Further, the bit-row center position in the radial direction is between the radial-directional probe positions of the second and third scans and closer to the probe position of the third scan during t=9T/16 to 13T/16 (its center: t=11T/16). The bit row center shifts again closer to the probe position of the second scan during t=13T/16 to 16T/16 (its center: t=15T/16). When the bit row center in the first scan at t=3T/16 is compared with the bit row center in the third scan at t=11T/16, the probe position of the first scan at t=3T/16 is closer to the bit row center than the probe position of the third scan at t=11T/16. Thus, the positional deviation of the probe scan relative to the bit row can be detected by comparing the signal waveforms of the envelope signals 1 to 3.

A specific calculation method of the positional deviation amount from the envelope signals will be described. In FIGS. 17A to 17C, values of the envelope signals 1, 2 and 3 at the position of the local maximum value of the envelope signal 1 are respectively denoted by S1A, S2A and S3A. Values of the envelope signals 1, 2 and 3 at the position of the local maximum value of the envelope signal 3 are respectively denoted by S1B, S2B and S3B. Positions of the local maximum values of the envelope signals 1 and 3 are respectively denoted by Δt1 and Δt2. The circular scan start position (angle) is represented by O [rad], and the deviation direction between the bit-row array center and the probe's scan center is represented by θ [rad]. From angle values obtained by reducing the local maximum positions Δt1 and Δt2 of the envelope signals 1 and 3, angles, at which the probe of the first and third scans respectively approach the bit row most closely, can be calculated. Here, it is assumed that the angles of the local maxima of the envelope signals in the first and third scans shift from each other by π [rad]. From the above, the deviation direction between the bit-row array center and the probe's scan center is represented by:

$$\theta = \pi(\Delta t1/T + \Delta t2/T - \tfrac{1}{2})$$

The position of the bit row is then obtained by calculating the gravity centers of the signal intensities of the first, second and third scans in the radial direction. When the radial-directional position of the bit row is represented by r1 at the position where the envelope signal 1 takes the local maximum value, r1 is given by:

$$r1 = r0 + \{(+\Delta r)\cdot S1A + 0\cdot S2A + (-\Delta r)\cdot S3A\}/(S1A + S2A + S3A)$$

Similarly, when the radial-directional position of the bit row is represented by r3 at the position where the envelope signal 3 takes the local maximum value, r3 is given by:

$$r3 = r0 + \{(+\Delta r)\cdot S1B + 0\cdot S2B + (-\Delta r)\cdot S3B\}/(S1B + S2B + S3B)$$

From the above relations, the deviation amount ΔOdev between the bit-row array center and the probe's scan center can be obtained as:

$$\Delta Odev = \{(r1-r0) + (r0-r3)\}/2 = (r1-r3)/2$$

Similarly, the deviation amount ΔRdev between the bit-row array diameter and the probe's scan diameter can be obtained as:

$$\Delta Rdev = (r1+r3)/2 - r0$$

As discussed above, a plurality of probe scans are carried out to the circularly-arrayed bit row and the bit detection signals are obtained. From those bit detection signals, the deviation direction θ of the probe scan center relative to the bit-row array center, the deviation amount ΔOdev of the probe scan center relative to the bit-row array center and the deviation amount ΔRdev of the probe scan diameter relative to the bit-row array diameter can be obtained.

FIG. 18 shows the manner of correcting the positional deviation.

During the plural scans of the bit row on a track 1, the deviation direction θ of the probe's scan center relative to the bit-row array center, the deviation amount ΔOdev of the probe's scan center relative to the bit-row array center and the deviation amount ΔRdev of the probe's scan diameter relative to the bit-row array diameter are obtained as described above. The plural scans of the bit row on a track 2 are performed after the track move such that those deviation amounts are corrected. Similar to the above, scans of the bit row on a track n+1 are performed such that the deviation amounts obtained during the plural scans of the bit row on a track n are corrected.

The manner of correction may be as follows. First, the positional deviation amounts detected on the previously-scanned several tracks are averaged, and the correction amount on a next track is thus calculated. Second, the averaging is executed by putting the heavier weight on the deviation amount obtained during the newer track in time to calculate the correction amount. By such a process, influences of error factors in the positional deviation detection, which occur on a certain track incidentally, can be reduced, and a highly-reliable tracking can be attained. Further, the correction amount on a next track may be calculated taking into account a change with time in the positional deviation amounts detected on the previously-scanned several tracks. By such a process, the tracking can highly precisely follow the change with time in the positional deviation.

In Embodiments 3 and 4, three scans shifted by bits in the y-direction are performed to one bit row, and the deviation amount is calculated. The present invention, however, is not limited to such an example. In the present invention, the number of scans is two or more and the positional deviation amount is detected. When the number of scans is increased, precision of the positional deviation detection is improved, but the reproduction speed is lowered. In the actual apparatus, an appropriate scanning number may be selected, considering needed precision of the positional deviation detection and needed reproduction speed, on the basis on the mechanical characteristics of record medium, probe, electric circuits, apparatus and the like.

The tracking systems of Embodiments 3 and 4 of the present invention are suitable for an apparatus with a plurality of probes for the following reasons. The plural probes are integrally united into a single unit, and this unit is positioned relative to the record medium. Thus, recording and reproduction operations are simultaneously performed in a parallel manner by the plural probes. As a result, the recording and reproduction speeds are increased in proportion to the number of the probes without modifying the mechanism for driving the probes relative to the record medium. Actually, however, there exist the xy-directional positional deviations of the plural probe tips due to errors occurring during the fabrication of the probes, the xy-directional positional deviations of the bits formed during the recording, thermal expansion and contraction due to a change in the ambient temperature, and the like. Therefore, there is a case where the plural probes have respectively individual positional deviations relative to the corresponding bit rows and the access of the plural probes to the corresponding bit rows can not be performed at the same time. Even in such a case, since a plurality of scans are performed with their positions being shifted from each other in the above-discussed tracking system, the accesses of the plural probes to the bit rows are advantageously carried out with access time being shifted from each other and the positional deviation amount can be detected.

Figure 19:
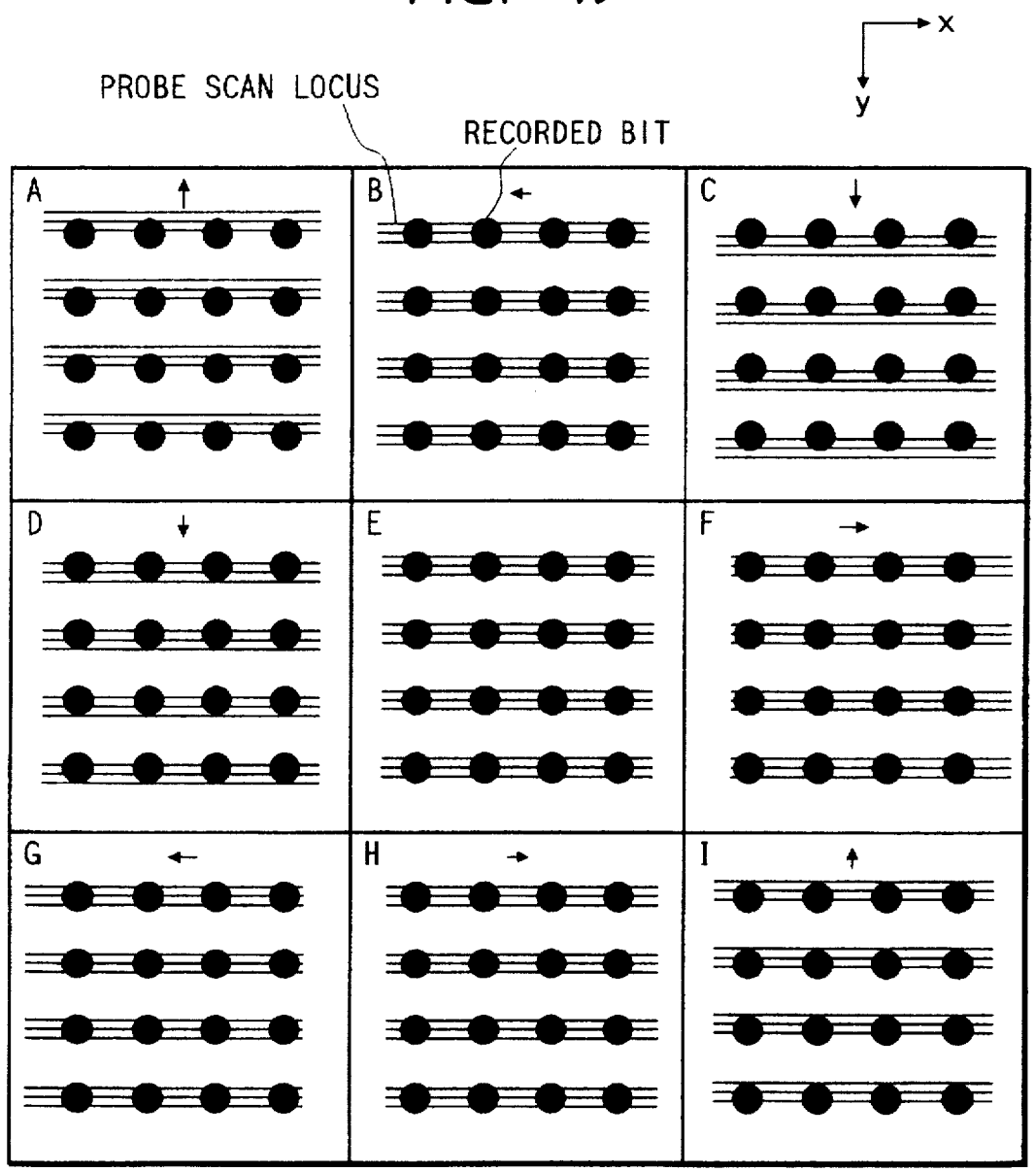
FIG. 19 is a view illustrating an access manner of a plurality of probes to respective bit rows where the positional deviation exists in Embodiment 3 of the present invention.
Figure 20:
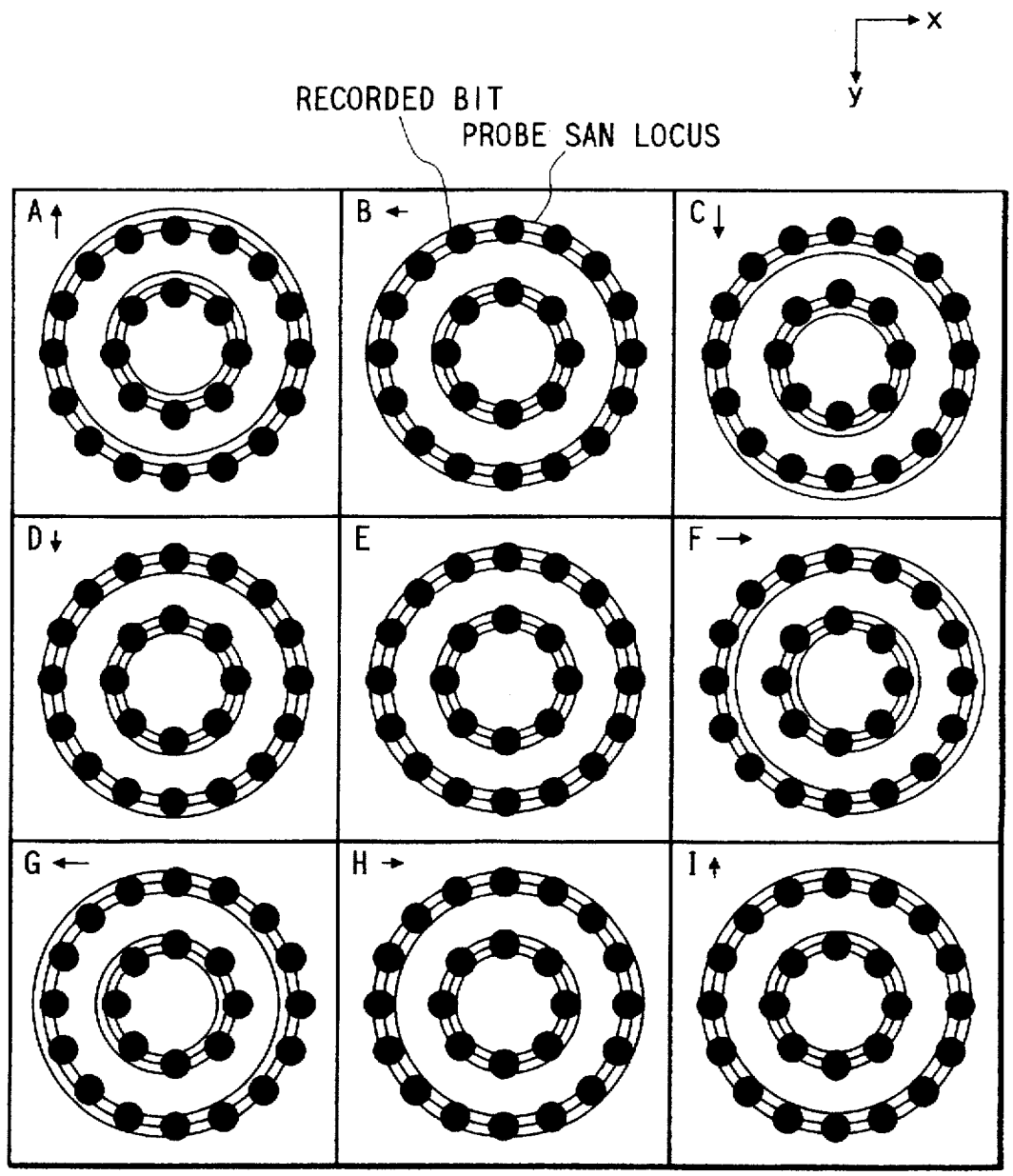
FIG. 20 is a view illustrating an access manner of a plurality of probes to respective bit rows where the positional deviation exists in Embodiment 4 of the present invention.

Access manners to the respective bit rows according to Embodiments 3 and 4 are illustrated in FIGS. 19 and 20 when the above-discussed individual positional deviations exist in the plural probes. Zones E in FIGS. 19 and 20 illustrate cases where the plural probes are positioned relative to the corresponding bit rows without any xy-directional positional deviations. Zones B, F, G and H illustrate cases where there are relative positional deviations in the x-direction. Zones A, C, D and I illustrate cases where there are relative positional deviations in the y-direction. Thus, even if the respective probes have individual positional deviations relative to the corresponding bit rows, the tracking control can be attained according to the above system without any bit detection errors when such positional deviation amount is within the width of the plural scans. In this case, when the tracking control is performed while the positional correction between the entire probes and the record medium (the bit row) is executed such that the positional deviation amount detected by a predetermined probe of the plural probes is corrected, the signal processing is simplified and high-speed tracking control is attained. This is the simplest method. Compared therewith, the speed of the tracking control is decreased and the accuracy is improved, when averages of all the positional deviation amounts detected by all the plural probes are calculated and the tracking control is carried out by correcting the positions between the entire probes and the record medium such that the thus-calculated averages are corrected. Further, there is an intermediate method in which predetermined plural probes are selected from the plural probes, averages of the positional deviation amounts detected by those predetermined probes are calculated and the tracking control is carried out by correcting the positions between the entire probes and the record medium such that the thus-calculated averages are corrected.

What is claimed is:

1. An information recording and/or reproduction apparatus in which a recorded bit row of a record medium is relatively scanned with a probe and the recorded bit row is detected, said apparatus comprising:

scanning means for effecting a plurality of relative scans of the recorded bit row with the probe;

tilt detecting means for detecting a tilt of the recorded bit row relative to a direction of the relative scan on the basis of a reproduction signal obtained by the scans performed by said scanning means; and correction means for correcting the direction of the relative scan on the basis of a detected result obtained by said detecting means.

2. An information recording and/or reproduction apparatus according to claim 1, wherein the relative scan is a raster scan.

3. An information recording and/or reproduction apparatus according to claim 1, wherein the relative scan is a circular scan.

4. An information recording and/or reproduction apparatus according to claim 2, wherein a scan interval of the raster scan is a half of a diameter of the recorded bit or less.

5. An information recording and/or reproduction apparatus according to claim 2, wherein said tilt detecting means includes means for generating a binarized image from the reproduction signal, means for detecting coordinates of two or more than two predetermined recorded bits from the binarized image, and means for detecting the tilt of the recorded bit row relative to the direction of the relative scan.

6. An information recording and/or reproduction apparatus according to claim 2, wherein said tilt detecting means includes means for generating a plurality of envelope signals of the reproduction signals obtained by the plurality of the relative scans, means for dividing each envelope signal into an equal number of time blocks, means for detecting a time-averaged signal in each time block, means for calculating a gravity-center position in a direction perpendicular to the recorded bit row of intensities of the time-averaged signal in each block, and means for calculating an approximate line for the gravity-center position in each time block to detect the tilt of the relative scan from a slope of the approximate line.

7. An information recording and/or reproduction apparatus according to claim 3, wherein the recorded bit row is formed in a circular form, and wherein said tilt detecting means includes means for detecting a local maximum value of the reproduction signal obtained by the relative scan, means for detecting a level of the reproduction signal obtained by another relative scan, at a position on a time axis which has the local maximum value, and means for detecting the tilt of the relative scan on the basis of a difference between the levels.

8. An information recording and/or reproduction apparatus according to claim 7, wherein the tilt is represented by a deviation amount between a center of the circularly-formed recorded bit row and a center of the circular scan.

9. An information recording and/or reproduction method in which a recorded bit row on a record medium is relatively scanned with a probe and the recorded bit is detected, said method comprising:

a scanning step of effecting a plurality of relative scans of the recorded bit row with the probe;

a detecting step of detecting a tilt of the recorded bit row relative to a direction of the relative scan on the basis of a reproduction signal obtained by the scans performed in said scanning step; and a correction step of correcting the direction of the relative scan on the basis of a detected result obtained in said detecting step.

* * * * *

UNITED STATES PATENT AND TRADEMARK OFFICE
CERTIFICATE OF CORRECTION

PATENT NO. : 5,757,760
DATED : May 26, 1998
INVENTOR(S) : SHUNICHI SHIDO, ET AL.

It is certified that error appears in the above-identified patent and that said Letters Patent is hereby corrected as shown below:

COLUMN 1

Line 40, "application" should read --applications--.

COLUMN 3

Line 21, "method" should read --methods--
　　　　　　　and "method." should read --methods.--; and
　　　Line 31, "scan," should read --scans,--.

COLUMN 4

Line 22, "deviation" should read --deviations--.

COLUMN 5

Line 15, "in" should read --in the--; and
　　　Line 46, "conjugated" should read --a conjugated--.

COLUMN 6

Line 5, "those" should read --the--;
　　　Line 45, "every a" should read --every--; and
　　　Line 50, "binarized" (first occurrence)
　　　　　　　should read --a binarized--.

COLUMN 7

Line 33, "slopes of" should read --slopes of $\pm$--.

UNITED STATES PATENT AND TRADEMARK OFFICE
CERTIFICATE OF CORRECTION

PATENT NO. : 5,757,760
DATED : May 26, 1998
INVENTOR(S) : SHUNICHI SHIDO, et al          Page 2 of 3

It is certified that error appears in the above-identified patent and that said Letters Patent is hereby corrected as shown below:

COLUMN 8

Line 1, "Q" should read $--\ell--$;
Line 23, "Vx=ax(Lm cos.$\theta$ e sin fmt+Ls sin$\theta$ sin fst)" should read --Vx=ax(Lm cos$\theta$ sin fmt+Ls sin$\theta$ sin fst)--;
Line 24, "Vy=ay(Lm sin$\theta$ sin fmt+Ls cos $\theta$" should read --Vy=ay(Lm sin$\theta$ sin fmt+Ls cos$\theta$ sin fst)--; and
Line 41, "$\alpha$to" should read --$\alpha$ to--.

COLUMN 9

Line 6, "conjugated" should read --a conjugated--; and
Line 48, "conjugated" should read --a conjugated--.

COLUMN 10

Line 2, "Con-" should read --The con- --.

COLUMN 12

Line 46, "an" should read --a--.

COLUMN 14

Line 21, "gevin" should read --given--.

UNITED STATES PATENT AND TRADEMARK OFFICE
CERTIFICATE OF CORRECTION

PATENT NO. : 5,757,760
DATED : May 26, 1998
INVENTOR(S) : SHUNICHI SHIDO, ET AL.

It is certified that error appears in the above-identified patent and that said Letters Patent is hereby corrected as shown below:

<u>COLUMN 15</u>

Line 4, "basis on" should read --basis of--.

<u>COLUMN 19</u>

Line 24, "basis on" should read --basis of--; and
Line 48, "can not" should read --cannot--.

Signed and Sealed this

Twenty-third Day of February, 1999

Q. TODD DICKINSON

Attest:

*Attesting Officer*    *Acting Commissioner of Patents and Trademarks*